US009303111B2

(12) United States Patent
Tamareselvy et al.

(10) Patent No.: US 9,303,111 B2
(45) Date of Patent: Apr. 5, 2016

(54) ACRYLATE-OLEFIN COPOLYMERS, METHODS FOR PRODUCING SAME AND COMPOSITIONS UTILIZING SAME

(71) Applicant: Lubrizol Advanced Materials, Inc., Cleveland, OH (US)

(72) Inventors: Krishnan Tamareselvy, Brecksville, OH (US); Robert J. Pafford, IV, North Royalton, OH (US); Libin Du, Troy, MI (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 14/355,615

(22) PCT Filed: Nov. 1, 2012

(86) PCT No.: PCT/US2012/062951
§ 371 (c)(1),
(2) Date: May 1, 2014

(87) PCT Pub. No.: WO2013/067109
PCT Pub. Date: May 10, 2013

(65) Prior Publication Data
US 2014/0275460 A1 Sep. 18, 2014

Related U.S. Application Data

(60) Provisional application No. 61/554,120, filed on Nov. 1, 2011.

(51) Int. Cl.
| *C08F 220/18* | (2006.01) |
| *C08F 226/10* | (2006.01) |
| *C08F 226/06* | (2006.01) |
| *C08F 210/14* | (2006.01) |
| *C08F 220/14* | (2006.01) |
| *C08F 222/10* | (2006.01) |

(52) U.S. Cl.
CPC .............. *C08F 220/18* (2013.01); *C08F 226/06* (2013.01); *C08F 226/10* (2013.01); *C08F 210/14* (2013.01); *C08F 220/14* (2013.01); *C08F 222/1006* (2013.01)

(58) Field of Classification Search
CPC .... C08F 220/18; C08F 226/06; C08F 226/10; C08F 210/14; C08F 220/14; C08F 222/1006
USPC ..................... 526/264, 308, 318.43
See application file for complete search history.

(56) References Cited

U.S. PATENT DOCUMENTS

| 4,921,898 | A | 5/1990 | Lenney et al. |
| 5,070,134 | A | 12/1991 | Oyamada et al. |
| 5,110,856 | A | 5/1992 | Oyamada et al. |
| 5,629,370 | A | 5/1997 | Freidzon |
| 5,856,379 | A * | 1/1999 | Shiratsuchi et al. .......... 523/209 |
| 7,816,441 | B2 | 10/2010 | Elizalde et al. |
| 2002/0058752 | A1* | 5/2002 | Lau et al. ......................... 525/64 |
| 2002/0077399 | A1* | 6/2002 | Kanai et al. .................. 524/294 |
| 2009/0221729 | A1* | 9/2009 | Kulkarni et al. ................ 522/62 |

FOREIGN PATENT DOCUMENTS

| DE | 1720277 A1 | 6/1967 |
| DE | 19620817 A1 | 11/1997 |
| EP | 0295727 A2 | 12/1988 |
| EP | 0757065 A2 | 7/1996 |
| EP | 1114833 A2 | 7/2001 |
| EP | 1384729 A1 | 1/2004 |
| WO | 03/042254 A1 | 5/2003 |
| WO | 03/091297 A1 | 11/2003 |
| WO | 2007/113180 A1 | 10/2007 |

* cited by examiner

Primary Examiner — Ling Choi
Assistant Examiner — Chun-Cheng Wang
(74) Attorney, Agent, or Firm — Thoburn T. Dunlap

(57) ABSTRACT

The present invention relates to a thickeners that are the polymerization product of a monomer mixture comprising: (a) at least one C3 to C30 olefin; (b) at least one monomer that contains at least one carboxylic acid group; (c) at least one ethylenically unsaturated ester monomer; and (d) one or more crosslinking compounds. Optionally, the above multi-purpose polymer compositions can further include any combination of one or more of: (e) at least one functional monomer; (f) at least one associative hydrophobic monomer; and/or (g) at least one chain transfer agent (CTA) and/or at least one polymeric stabilizer. The thickeners of the present invention are useful in a variety of products including, but not limited to, personal care products, health care products, household care products, institutional and industrial care products, and industrial applications.

38 Claims, No Drawings

ACRYLATE-OLEFIN COPOLYMERS, METHODS FOR PRODUCING SAME AND COMPOSITIONS UTILIZING SAME

CROSS REFERENCE TO RELATED APPLICATION

This application claims priority from PCT Application Serial No. PCT/US2012/062951 filed on Nov. 1, 2012, which claims the benefit of U.S. Provisional Application No. 61/554,120 filed on Nov. 1, 2011.

FIELD OF THE INVENTION

The present invention relates to a thickeners that are the polymerization product of a monomer mixture comprising: (a) at least one $C_3$ to $C_{30}$ olefin; (b) at least one monomer that contains at least one carboxylic acid group; (c) at least one ethylenically unsaturated ester monomer; and (d) one or more crosslinking compounds. Optionally, the above multi-purpose polymer compositions can further include any combination of one or more of: (e) at least one functional monomer; (f) at least one associative hydrophobic monomer; and/or (g) at least one chain transfer agent (CTA) and/or at least one polymeric stabilizer. The thickeners of the present invention are useful in a variety of products including, but not limited to, personal care products, health care products, household care products, institutional and industrial care products, and industrial applications.

BACKGROUND OF THE INVENTION

An associative polymer contains pendant groups capable of forming non-specific "associations" with other groups in the polymer or other materials in the medium in which the polymer is present. Generally, the pendant group has both hydrophobic and hydrophilic regions and the associations are generally based on hydrophobic interactions. Hydrogen bonding associations between hydrophilic groups have also been seen under some pH conditions. According to theory, such associations result in thickening by the formation of interpolymer networks above a critical polymer overlap concentration.

Processes for preparing polymers based on alkenes and other copolymerizable ethylenically unsaturated compounds are well known to the skilled worker. The copolymerization takes place essentially in the form of a solution polymerization (see, for example, A. Sen et al., Journal American Chemical Society, 2001, 123, pp. 12738 to 12739; B. Klumperman et al., Macromolecules, 2004, 37, pp. 4406 to 4416; A. Sen et al., Journal of Polymer Science, Part A: Polymer Chemistry, 2004, 42(24), pp. 6175 to 6192; WO 03/042254, WO 03/091297 or EP-A 1384729) or in the form of an aqueous emulsion polymerization, this taking place in particular on the basis of the lowest alkene, ethene (see, for example, U.S. Pat. Nos. 4,921,898, 5,070,134, 5,110,856, and 5,629,370, or EP Patent Nos. EP-A 295727, EP-A 757065, EP-A 1114833 or German Patent No. DE-A 196 20 817).

Prior art relating to free-radically initiated aqueous emulsion polymerization using higher alkenes is as follows. For example, DE-A 1720277 discloses a process for preparing polymer dispersions using vinyl esters and 1-octene. The weight ratio of vinyl ester to 1-octene can be from 99:1 to 70:30. Optionally, the vinyl esters can be used to a minor extent in a mixture with other copolymerizable ethylenically unsaturated compounds for the emulsion polymerization.

S. M. Samoilov in J. Macromol. Sci. Chem., 1983, A19(1), pp. 107 to 122 describe the free-radically initiated aqueous emulsion polymerization of propene with different ethylenically unsaturated compounds. The outcome observed there was that the copolymerization of propene with ethylenically unsaturated compounds having strongly electron-withdrawing groups, such as chlorotrifluoroethylene, trifluoroacrylonitrile, maleic anhydride or methyl trifluoroacrylate, gave polymers having a markedly higher propene fraction, or copolymers having higher molecular weights, than when using the typical ethylenically unsaturated compounds of free-radically initiated aqueous emulsion polymerization, viz. vinyl acetate, vinyl chloride, methyl acrylate, and butyl acrylate. The reasons given for this behavior include in particular the hydrogen radical transfer reactions that are typical of the higher alkenes.

Additionally, U.S. Pat. No. 7,816,441 discloses the use of low molecular weight addition polymer A with a molecular weight of less than 100,000 Daltons composed in copolymerized form of 0.1 percent to 40 percent by weight of at least one $C_3$ to $C_{30}$ alkene, 40 percent to 99.9 percent by weight of at least one ethylenically unsaturated $C_3$ to $C_6$ monocarboxylic acid, 0 percent to 50 percent by weight of at least one ethylenically unsaturated $C_4$ to $C_{12}$ dicarboxylic acid and/or of the ethylenically unsaturated dicarboxylic monoalkyl esters or dicarboxylic anhydrides obtainable from said acid, and 0 percent to 30 percent by weight of at least one other ethylenically unsaturated compound which is copolymerizable with the aforementioned monomers, as a dispersing assistant in free-radically initiated aqueous emulsion or suspension polymerization.

Accordingly, there is an ongoing, unresolved need and desire for polymer compositions having improved rheological and aesthetic properties in an aqueous and surfactant media. The polymer compositions of the present invention are based on utilizing alpha olefins to enhance thickening and rheological properties of the aqueous system.

SUMMARY OF THE INVENTION

The present invention relates to a thickeners that are the polymerization product of a monomer mixture comprising: (a) at least one $C_3$ to $C_{30}$ olefin; (b) at least one monomer that contains at least one carboxylic acid group; (c) at least one ethylenically unsaturated ester monomer; and (d) one or more crosslinking compounds. Optionally, the above multi-purpose polymer compositions can further include any combination of one or more of: (e) at least one functional monomer; (f) at least one associative hydrophobic monomer; and/or (g) at least one chain transfer agent (CTA) and/or at least one polymeric stabilizer. The thickeners of the present invention are useful in a variety of products including, but not limited to, personal care products, health care products, household care products, institutional and industrial care products, and industrial applications.

In one embodiment, the present invention relates to a polymer that is the reaction product of the polymerization of a monomer mixture comprising:
(i) (a), (b), (c), and (d);
(ii) (a), (b), (c), (d) and (e);
(iii) (a), (b), (c), (d) and (f);
(iv) (a), (b), (c), (d) and (g);
(v) (a), (b), (c), (d), (e) and (f);
(vi) (a), (b), (c), (d), (e) and (g);
(vii) (a), (b), (c), (d), (f) and (g); or
(viii) (a), (b), (c), (d), (e), (f) and (g), where (a) is at least one $C_3$ to $C_{30}$ olefin; (b) is at least one monomer that contains at least one carboxylic acid group; (c) is at least one ethylenically unsaturated ester; (d) is one or more crosslinking compounds; (e) at least one functional monomer selected from one or more functional monomer compounds selected from one or more hydroxy($C_1$-$C_{18}$)alkyl (meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers, or mixtures of any two or more thereof including mixtures of any two or more of the same class of compounds or mixtures of any two or more of different classes of compounds; (f) is at least one associative hydrophobic monomer; and (g) is at least one chain transfer agent (CTA) and/or at least one polymeric stabilizer. Regarding each of components (a) through (g), one or more of each respective individual component could be utilized in the present invention.

In another embodiment, the present invention relates to a polymer that is the reaction product of the polymerization of a monomer mixture comprising:
(i) (a), (b), (c), and (d);
(ii) (a), (b), (c), (d) and (e);
(iii) (a), (b), (c), (d) and (f);
(iv) (a), (b), (c), (d) and (g);
(v) (a), (b), (c), (d), (e) and (f);
(vi) (a), (b), (c), (d), (e) and (g);
(vii) (a), (b), (c), (d), (f) and (g); or
(viii) (a), (b), (c), (d), (e), (f) and (g),
where (a) is at least one $C_3$ to $C_{30}$ olefin and is present in the range of about 1 weight percent to about 25 weight percent; (b) is at least one monomer that contains at least one carboxylic acid group and is present in the range of about 10 weight percent to about 55 weight percent; (c) is at least one ethylenically unsaturated ester and is present in the range of about 20 weight percent to about 75 weight percent; (d) is one or more crosslinking compounds and is present in the range of about 0.01 weight percent to about 5 weight percent; (e) at least one functional monomer selected from one or more functional monomer compounds selected from one or more hydroxy($C_1$-$C_{18}$)alkyl(meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds and is present in the range of about 1 weight percent to about 40 weight percent; (f) at least one associative hydrophobic monomer and is present in the range of about 0.1 weight percent to about 25 weight percent; (g) at least one chain transfer agent (CTA) and/or at least one polymeric stabilizer and is present in the range of about 0.1 weight percent to about 5 weight percent. Regarding each of components (a) through (g), one or more of each respective individual component could be utilized in the present invention.

In still another embodiment, the present invention relates to a polymer that is the reaction product of the polymerization of a monomer mixture comprising:
(i) (a), (b), (c), and (d);
(ii) (a), (b), (c), (d) and (e);
(iii) (a), (b), (c), (d) and (f);
(iv) (a), (b), (c), (d) and (g);
(v) (a), (b), (c), (d), (e) and (f);
(vi) (a), (b), (c), (d), (e) and (g);
(vii) (a), (b), (c), (d), (f) and (g); or
(viii) (a), (b), (c), (d), (e), (f) and (g),
where (a) is at least one $C_3$ to $C_{30}$ olefin and is present in the range of about 1.5 weight percent to about 22.5 weight percent; (b) is at least one monomer that contains at least one carboxylic acid group and is present in the range of about 12.5 weight percent to about 52.5 weight percent; (c) is at least one ethylenically unsaturated ester and is present in the range of about 22.5 weight percent to about 72.5 weight percent; (d) is one or more crosslinking compounds and is present in the range of about 0.05 weight percent to about 4.5 weight percent; (e) at least one functional monomer selected from one or more functional monomer compounds selected from one or more hydroxy($C_1$-$C_{18}$)alkyl(meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds and is present in the range of about 1.5 weight percent to about 37.5 weight percent; (f) at least one associative hydrophobic monomer and is present in the range of about 0.2 weight percent to about 22.5 weight percent; (g) at least one chain transfer agent (CTA) and/or at least one polymeric stabilizer and is present in the range of about 0.2 weight percent to about 4.5 weight percent. Regarding each of components (a) through (g), one or more of each respective individual component could be utilized in the present invention.

DETAILED DESCRIPTION OF THE INVENTION

The present invention relates to a thickeners that are the polymerization product of a monomer mixture comprising: (a) at least one $C_3$ to $C_{30}$ olefin; (b) at least one monomer that contains at least one carboxylic acid group; (c) at least one ethylenically unsaturated ester monomer; and (d) one or more crosslinking compounds. Optionally, the above multi-purpose polymer compositions can further include any combination of one or more of: (e) at least one functional monomer; (f) at least one associative hydrophobic monomer; and/or (g) at least one chain transfer agent (CTA) and/or at least one polymeric stabilizer. The thickeners of the present invention are useful in a variety of products including, but not limited to, personal care products, health care products, household care products, institutional and industrial care products, and industrial applications.

The polymers, or thickeners, of the present invention comprise: (a) at least one $C_3$ to $C_{30}$ olefin; (b) at least one monomer that contains at least one carboxylic acid group; (c) at least one ethylenically unsaturated ester; and (d) one or more crosslinking compounds. Furthermore, the polymer of the present invention can also optionally contain substituent groups derived from other monomer units, such as crosslinking monomer units, chain transfer agent units, polymeric stabilizers, and the like. In still another embodiment, the above multi-purpose polymer compositions can further include any combination of one or more of: (e) at least one functional monomer selected from one or more functional monomer compounds selected from one or more hydroxy $(C_1\text{-}C_{18})$alkyl(meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds; (f) at least one associative hydrophobic monomer; and/or (g) at least one chain transfer agent (CTA) and/or at least one polymeric stabilizer. Furthermore, the polymer of the present invention can also optionally contain substituent groups derived from other monomer units, such as crosslinking monomer units, hydroxy-substituted nonionic vinyl monomer units, chain transfer agent units, polymeric stabilizers, and the like. For convenience, the polymers of the present invention are generally referred to herein as "thickeners."

The term "personal care products" as used herein includes, without being limited thereto, cosmetics, toiletries, cosmeceuticals and beauty aids, personal hygiene and cleansing products applied to the skin, hair, scalp, and nails of humans and animals. The term "health care products" as used herein includes, without being limited thereto, pharmaceuticals, pharmacosmetics, oral care products (mouth, teeth), eye care products, ear care products and over-the-counter products and appliances, such as patches, plasters, dressings and the like, and medical devices externally applied to or into the body of humans and animals for ameliorating a health-related or medical condition, for generally maintaining hygiene or well-being, and the like. The term "body" includes the keratinous (hair, nails) and non-keratinous skin areas of the entire body (face, trunk, limbs, hands and feet), the tissues of body openings and eyes, and the term "skin" includes the scalp and mucous membranes. The term "household care products" as used herein includes, without being limited thereto, products employed in a domestic household for surface cleaning or biocidal cleaning products for maintaining sanitary conditions, such as in the kitchen and bathroom, and laundry products for fabric care and cleaning, and the like. The term "institutional and industrial care" and "I&I," as used herein includes, without being limited thereto, products employed for cleaning or maintaining sanitary conditions in industrial and institutional environments, including hospital and health care facilities, and the like.

As used herein, the term "rheological properties" and grammatical variations thereof, includes, without limitation such properties as Brookfield viscosity, increase or decrease in viscosity in response to shear stress, flow characteristics, gel properties such as stiffness, resilience, flowability, and the like, foam properties such as foam stability, foam density, ability to hold a peak, and the like, suspension properties such as yield value, and aerosol properties such as ability to form aerosol droplets when dispensed from propellant based or mechanical pump type aerosol dispensers.

Given the above, the polymers, or thickeners, of the present invention are, in one embodiment, prepared by polymerizing a mixture containing:
(i) (a), (b), (c), and (d);
(ii) (a), (b), (c), (d) and (e);
(iii) (a), (b), (c), (d) and (f);
(iv) (a), (b), (c), (d) and (g);
(v) (a), (b), (c), (d), (e) and (f);
(vi) (a), (b), (c), (d), (e) and (g);
(vii) (a), (b), (c), (d), (f) and (g); or
(viii) (a), (b), (c), (d), (e), (f) and (g),
where (a) is at least one $C_3$ to $C_{30}$ olefin; (b) is at least one monomer that contains at least one carboxylic acid group; (c) is at least one ethylenically unsaturated ester; (d) is one or more crosslinking compounds; (e) at least one functional monomer selected from one or more functional monomer compounds selected from one or more hydroxy$(C_1\text{-}C_{18})$alkyl (meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds; (f) is at least one associative hydrophobic monomer; and (g) is at least one chain transfer agent (CTA) and/or at least one polymeric stabilizer. Regarding each of components (a) through (g), one or more of each respective individual component could be utilized in the present invention.

In one embodiment, the inventive polymer, or multi-purpose polymer, compositions of the present invention is the polymerization product of a monomer mixture comprising, on a total monomer mixture weight basis: The polymers, or thickeners, of the present invention comprise: (a) about 1 weight percent to about 25 weight percent of the at least one $C_3$ to $C_{30}$ olefin; (b) about 10 weight percent to about 55 weight percent of the at least one monomer that contains at least one carboxylic acid group; (c) about 20 weight percent to about 75 weight percent of the at least one ethylenically unsaturated ester; and (d) about 0.01 weight percent to about 5 weight percent of the one or more crosslinking compounds. Furthermore, if present, the polymer of the present invention can also optionally include any combination of one or more of: (e) up to about 40 weight percent of at least one functional monomer selected from one or more functional monomer compounds selected from one or more hydroxy$(C_1\text{-}C_{18})$alkyl (meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds; (f) up to about 25 weight percent of at least one associative hydrophobic monomer; (g) up to about 5 weight percent of at least one chain transfer agent (CTA) and/or at least one polymeric stabilizer.

In another embodiment, the multi-purpose polymer of the present invention is the polymerization product of a monomer mixture comprising, on a total monomer mixture weight basis: (a) about 1.5 weight percent to about 22.5 weight percent of the at least one $C_3$ to $C_{30}$ olefin; (b) about 12.5 weight percent to about 52.5 weight percent of the at least one monomer that contains at least one carboxylic acid group; (c) about 22.5 weight percent to about 72.5 weight percent of the at least one ethylenically unsaturated ester; and (d) about 0.05 weight percent to about 4.5 weight percent of the one or more crosslinking compounds. Furthermore, if present, the polymer of the present invention can also optionally include any combination of one or more of: (e) up to about 40 weight percent of at least one functional monomer selected from one or more functional monomer compounds selected from one or more hydroxy($C_1$-$C_{18}$)alkyl(meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds; (f) about 0.1 to about 25 weight percent of at least one associative hydrophobic monomer; and/or (g) about 0.1 to about 5 weight percent of at least one chain transfer agent (CTA) and/or at least one polymeric stabilizer. Here, as well as elsewhere in the specification and claims, individual numerical values, or limits, from one or more embodiments and/or different ranges can be combined to form additional non-disclosed and/or non-stated ranges.

In another embodiment, the multi-purpose polymer of the present invention is the polymerization product of a monomer mixture comprising, on a total monomer mixture weight basis: (a) about 2 weight percent to about 20 weight percent of the at least one $C_3$ to $C_{30}$ olefin; (b) about 15 weight percent to about 50 weight percent of the at least one monomer that contains at least one carboxylic acid group; (c) about 25 weight percent to about 70 weight percent of the at least one ethylenically unsaturated ester; and (d) about 0.1 weight percent to about 4 weight percent of the one or more crosslinking compounds. Furthermore, if present, the polymer of the present invention can also optionally include any combination of one or more of: (e) up to about 40 weight percent of at least one functional monomer selected from one or more functional monomer compounds selected from one or more hydroxy($C_1$-$C_{18}$)alkyl(meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds; (f) about 0.5 to about 22.5 weight percent of at least one associative hydrophobic monomer; and/or (g) about 0.2 to about 4.5 weight percent of at least one chain transfer agent (CTA) and/or at least one polymeric stabilizer. Here, as well as elsewhere in the specification and claims, individual numerical values, or limits, from one or more embodiments and/or different ranges can be combined to form additional non-disclosed and/or non-stated ranges.

The terms "halogen-substituted," "hydroxy-substituted," "carboxy-substituted," "polyoxyalkylene-substituted," "alkyl-substituted," and "aryl-substituted" if used herein in reference to alkyl or aryl groups, and the like, mean that at least one hydrogen atom on an alkyl, aryl, or like group has been replaced by at least one halogen atom, hydroxyl group, carboxyl group, polyoxyalkylene group, alkyl group, or aryl group, respectively. The terms "poly(meth)acrylate" and "poly(meth)acrylamide" if used herein refer in the alternative to polyacrylate or polymethacrylate, and to polyacrylamide or polymethacrylamide, respectively.

Suitable monomers useful in the preparation of the thickeners of the present invention are described below. Regarding the monomers, the monomer mixtures, and the amount of each component of the "charges" utilized to form the thickeners of the present invention, the following should be noted. Although the total amount of each monomer or component of a various "charge" may individually total more than 100 weight percent when each component is taken individually and totaled using the broadest amounts disclosed herein, one of skill in the art will realize that this is not the case. Rather, each individual component (i.e., components (a) through (d) inclusive and, if present, components (e), (f) and (g)) of a various reaction "charge" of the present invention can be varied within any stated range as desired in order to achieve a total weight percent of 100.

In one embodiment, the thickener compositions, or thickeners, of the present invention possess an improved yield value and are aqueous-based thickeners. In another embodiment, the thickener compositions, or thickeners, of the present invention possess an improved viscosity at a comparable pH when compared to other thickeners and are aqueous-based thickeners. In one embodiment, the thickener compositions of the present invention have a viscosity of about 2,000 mPa·s to about 50,000 mPa·s, or from about 3,000 mPa·s to about 47,500 mPa·s, or from about 5,000 mPa·s to about 45,000 mPa·s, or from about 7,500 mPa·s to about 42,500 mPa·s, or from about 10,000 mPa·s to about 40,000 mPa·s, or from about 12,500 mPa·s to about 37,500 mPa·s, or from about 15,000 mPa·s to about 35,000 mPa·s, or from about 17,500 mPa·s to about 32,500 mPa·s, or from about 20,000 mPa·s to about 30,000 mPa·s, or from about 22,500 mPa·s to about 27,500 mPa·s, or from about 23,000 mPa·s to about 27,000 mPa·s, or even from about 24,000 mPa·s to about 26,000 mPa·s. In still another embodiment, the compositions, or thickeners (which in one embodiment are aqueous-based systems), of the present invention have an acid content of at least 10 weight percent in conjunction with a molecular weight of at least about 50,000 Daltons. In still another embodiment, the acid content of the compositions, or thickeners, of the present invention are at least about 60,000 Daltons, or at least about 70,000 Daltons, or at least about 75,000 Daltons, or at least about 80,000 Daltons, or at least about 90,000 Daltons, or at least about 100,000 Daltons, or at least about 125,000 Daltons, or even at least about 150,000 Daltons. Regarding the acid content of the compositions, or thickeners, of the present invention, it is in the range of about 11 weight percent to about 50 weight percent, or from about 12.5 weight percent to about 47.5 weight percent, or from about 15 weight percent to about 45 weight percent, or from about 17.5 weight percent to about 42.5 weight percent, or from about 20 weight percent to about 40 weight percent, or from about 22.5 weight percent to about 37.5 weight percent, or from about 25 weight percent to about 35 weight percent, or from about 27.5 weight percent to about 32.5 weight percent, or from about 29 weight percent to about 31 weight percent, or even about 30 weight percent. It should be noted that the any of the above acid contents, or weight percentages, can be combined with any of the afore-mentioned molecular weights. Here, as well as elsewhere in the specification and claims, individual numerical values, or limits, from one or more embodiments and/or different ranges can be combined to form additional non-disclosed and/or non-stated ranges.
The Olefin Monomer Component—Component (a):

Olefin compounds suitable for use for use in the preparation of the inventive thickeners are selected from linear, branched and/or cyclic $C_3$ to $C_{30}$ alkenes. In another embodiment, the olefin compounds suitable for use in conjunction with the present invention are selected from linear, branched and/or cyclic $C_4$ to $C_{18}$ alkenes, or even linear, branched and/or cyclic $C_5$ to $C_{12}$ alkenes which can be copolymerized free-radically and which apart from carbon and hydrogen have no further elements.

Examples of such olefin monomers include, but are not limited to, linear, branched and/or cyclic alkenes such as propene, n-but-1-ene, 2-methylpropene, 2-methylbut-1-ene, 3-methylbut-1-ene, 3,3-dimethyl-2-isopropylbut-1-ene, pent-1-ene, 2-methylpent-1-ene, 3-methylpent-1-ene, 4-methylpent-1-ene, 2-ethylpent-1-ene, 3-ethylpent-1-ene, 4-ethylpent-1-ene, 2,4,4-trimethylpent-1-ene, 3-ethyl-2-methylpent-1-ene, hex-1-ene, 2-methylhex-1-ene, 3-methylhex-1-ene, 4-methylhex-1-ene, 5-methylhex-1-ene, 3,4-dimethylhex-1-ene, 2,4-dimethylhex-1-ene, hept-1-ene, 2-methylhept-1-ene, 3-methylhept-1-ene, 4-methylhept-1-ene, 5-methylhept-1-ene, 6-methylhept-1-ene, 6,6-dimethylhept-1-ene, 3,3-dimethylhept-1-ene, 3,6-dimethylhept-1-ene, oct-1-ene, 2-methyloct-1-ene, 3-methyloct-1-ene, 4-methyloct-1-ene, 5-methyloct-1-ene, 6-methyloct-1-ene, 7-methyloct-1-ene, 7,7-dimethyloct-1-ene, 3,3-dimethyloct-1-ene, 4,7-dimethyloct-1-ene, non-1-ene, 2-methylnon-1-ene, 3-methylnon-1-ene, 4-methylnon-1-ene, 5-methylnon-1-ene, 6-methylnon-1-ene, 7-methylnon-1-ene, 8-methylnon-1-ene, dec-1-ene, 2-methyldec-1-ene, 3-methyldec-1-ene, 4-methyldec-1-ene, 5-methyldec-1-ene, 6-methyldec-1-ene, 7-methyldec-1-ene, 8-methyldec-1-ene, 9-methyldec-1-ene, 2,4-dimethyldec-1-ene, 4,8-dimethyldec-1-ene, undec-1-ene, 2-methylundec-1-ene, 3-methylundec-1-ene, 4-methylundec-1-ene, 5-methylundec-1-ene, 6-methylundec-1-ene, 7-methylundec-1-ene, 8-methylundec-1-ene, 9-methylundec-1-ene, 10-methylundec-1-ene, dodec-1-ene, 4,8-dimethyldec-1-ene, 4-ethyldec-1-ene, 6-ethyldec-1-ene, 8-ethyldec-1-ene, 2,5,8-trimethylnon-1-ene, tridec-1-ene, 2-methyldodec-1-ene, 11-methyldodec-1-ene, 6,10-dimethylundec-1-ene, tetradec-1-ene, 2-methyltridec-1-ene, 2-ethyldodec-1-ene, 2,6,10-trimethylundec-1-ene, 11-methyltridec-1-ene, 9-methyltridec-1-ene, 7-methyltridec-1-ene, 8-ethyldodec-1-ene, 6-ethyldodec-1-ene, 4-ethyldodec-1-ene, 6-butyldec-1-ene, pentadec-1-ene, 2-methyltetradec-1-ene, 3,7,11-trimethyldodec-1-ene, 2,6,10-trimethyldodec-1-ene, hexadec-1-ene, 2-methyl pentadec-1-ene, 3,7,11-trimethyltridec-1-ene, 4,8,12-trimethyltridec-1-ene, 11-methyl pentadec-1-ene, 13-methylpentadec-1-ene, 7-methylpentadec-1-ene, 9-methylpentadec-1-ene, 12-ethyltetradec-1-ene, 8-ethyltetradec-1-ene, 4-ethyltetradec-1-ene, 8-butyldodec-1-ene, 6-butyldodec-1-ene, heptadec-1-ene, 12-trimethyltetradec-1-ene, octadec-1-ene, 2-methylheptadec-1-ene, 13-methylheptadec-1-ene, 10-butyltetradec-1-ene, 6-butyltetradec-1-ene, 8-butyltetradec-1-ene, 10-ethylhexadec-1-ene, nonadec-1-ene, 1-methyloctadec-1-ene, 7,11,15-trimethylhexadec-1-ene, eicos-1-ene, 2,7,11,15-tetramethylhedec-1-ene, docos-1-ene, 4,9,13,17-tetramethyloctadec-1-ene, tetracos-1-ene, hexacos-1-ene, triacont-1-ene, dotriacont-1-ene or tritriacont-1-ene, and also one or more cyclic alkenes including, but not limited to, limonene (IUPAC name 1-methyl-4-(1-methylethenyl)-cyclohexene), β-pinene, β-terpinene, sabinene, camphene, β-cadinene, β-caryophyllene, or cedrene. In one embodiment, the one or more cyclic alkenes are free of styrene or analogs of styrene. By "free of," it is meant that the one or more cyclic alkenes of the present invention contain less than about 0.1 weight percent styrene and/or an analog of styrene, or even that the one or more cyclic alkenes of the present invention contain zero weight percent styrene and/or an analog of styrene. It will be appreciated that mixtures of any two or more of the aforementioned monomers can also be used as component (a).

In another embodiment, component (a) is selected from one or more linear olefin compounds (monomers) including, but not limited to, n-but-1-ene, pent-1-ene, hex-1-ene, hept-1-ene, oct-1-ene, non-1-ene, dec-1-ene, undec-1-ene, dodec-1-ene, or combinations of any two or more thereof. In still another embodiment, component (a) is selected from one or more branched olefin compounds (monomers) including, but not limited to, 2-methylpropene, 2-methylbut-1-ene, 2-methylpent-1-ene, 2,4,4-trimethylpent-1-ene, 3-ethyl-2-methylpent-1-ene, 2-methylhex-1-ene, 2,4-dimethylhex-1-ene, 2-methylhept-1-ene, 2-methyloct-1-ene, 2-methylnon-1-ene, 2-methyldec-1-ene, 2,4-dimethyldec-1-ene, 2-methylundec-1-ene, 2,5,8-trimethylnon-1-ene, or combinations of any two or more thereof. In still yet another embodiment, component (a) is selected from one or more cyclic olefin compounds (monomers) including, but not limited to, β-pinene, β-terpinene, sabinene, camphene, β-cadinene, β-caryophyllene, cedrene, or combinations of any two or more thereof. In still yet another embodiment, component (a) is limonene (IUPAC name 1-methyl-4-(1-methylethenyl)-cyclohexene.

In one embodiment, the olefin monomer (component (a)) comprises about 1 weight percent to about 25 weight percent, or from about 1.5 weight percent to about 22.5 weight percent, or from about 2 weight percent to about 20 weight percent, or from about 2.5 weight percent to about 17.5 weight percent, or from about 3 weight percent to about 15 weight percent, or from about 4 weight percent to about 15 weight percent, or from about 5 weight percent to about 12.5 weight percent, or even from about 7.5 weight percent to about 10 weight percent, based on a total monomer mixture weight basis. Here, as well as elsewhere in the specification and claims, individual numerical values, or limits, from one or more embodiments and/or different ranges can be combined to form additional non-disclosed and/or non-stated ranges.
The Carboxylic Acid Monomer—Component (b):

As utilized herein, component (b) of the present invention is at least one monomer that contains at least one carboxylic acid group as well as at least one carbon-carbon double bond, such monomers that are suitable for use in the preparation of the inventive thickeners are olefinically unsaturated monocarboxylic and dicarboxylic acids and salts thereof containing about 3 to about 5 carbon atoms, or even monocarboxylic acids, salts and anhydrides thereof. Suitable monomers in this class include, but are not limited to, acrylic acid, methacrylic acid, ethacrylic acid, alpha-chloroacrylic acid, alpha-cyano acrylic acid, itaconic acid, maleic acid, maleic anhydride, or combinations of any two or more thereof. In one embodiment, component (b) is selected from acrylic acid, methacrylic acid, fumaric acid, itaconic acid, itaconic anhydride, citraconic acid, citraconic anhydride, maleic acid, maleic anhydride, or salts thereof, or combinations of any two or more thereof. In still another embodiment, component (b) is acrylic acid.

In one embodiment, the carboxylic acid monomer (component (b)) comprises about 10 weight percent to about 55 weight percent, or from about 12.5 weight percent to about 52.5 weight percent, or from about 15 weight percent to about 50 weight percent, or from about 17.5 weight percent to about 47.5 weight percent, or from about 20 weight percent to about 45 weight percent, or from about 22.5 weight percent to about 42.5 weight percent, or from about 25 weight percent to about 40 weight percent, or from about 27.5 weight percent to about 37.5 weight percent, or from about 30 weight percent to about 35 weight percent, or even from about 32 weight percent to about 34 weight percent, based on a total monomer mixture weight basis. Here, as well as elsewhere in the specification and claims, individual numerical values, or limits, from one or more embodiments and/or different ranges can be combined to form additional non-disclosed and/or non-stated ranges.

The Ethylenically Unsaturated Ester Monomer—Component (c):

As utilized herein, component (c) of the present invention is an ethylenically unsaturated ester monomer. In one embodiment, the ester monomer of the present invention is a (meth)acrylic that contains 1 to 30 carbon atoms and is represented by Formula (I):

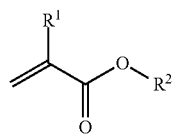

wherein $R^1$ is hydrogen or a methyl group and $R^2$ is a $C_1$ to $C_{30}$ linear alkyl group or a $C_3$ to $C_{30}$ branched alkyl group. In another embodiment, $R^2$ is a $C_2$ to $C_{24}$ linear alkyl group or a $C_3$ to $C_{24}$ branched alkyl group, or a $C_3$ to $C_{20}$ linear or branched alkyl group, a $C_4$ to $C_{19}$ linear or branched alkyl group, or a $C_5$ to $C_{18}$ linear or branched alkyl group, or a $C_6$ to $C_{17}$ linear or branched alkyl group, or a $C_7$ to $C_{16}$ linear or branched alkyl group, or a $C_8$ to $C_{15}$ linear or branched alkyl group, or a $C_9$ to $C_{14}$ linear or branched alkyl group, or a $C_{10}$ to $C_{13}$ linear or branched alkyl group, or even a $C_{12}$ to $C_{13}$ linear or branched alkyl group. Here, as well as elsewhere in the specification and claims, individual numerical carbon values, or limits, from one or more embodiments and/or different ranges can be combined to form additional non-disclosed and/or non-stated ranges. Representative monomers under Formula (II) include, but are not limited to, methyl (meth)acrylate, ethyl (meth)acrylate, butyl (meth)acrylate, sec-butyl (meth)acrylate, iso-butyl (meth)acrylate, hexyl (meth)acrylate, heptyl(meth)acrylate, octyl(meth)acrylate, 2-ethylhexyl(meth)acrylate, decyl(meth)acrylate, isodecyl (meth)acrylate, lauryl(meth)acrylate, tetradecyl(meth)acrylate, hexadecyl(meth)acrylate, stearyl(meth)acrylate, behenyl(meth)acrylate, or mixtures of any two or more thereof.

In one embodiment, the ethylenically unsaturated ester compound (component (c)) comprises about 20 weight percent to about 75 weight percent, or from about 22.5 weight percent to about 72.5 weight percent, or from about 25 weight percent to about 70 weight percent, or from about 27.5 weight percent to about 67.5 weight percent, or from about 30 weight percent to about 65 weight percent, or from about 32.5 weight percent to about 62.5 weight percent, or from about 35 weight percent to about 60 weight percent, or from about 37.5 weight percent to about 57.5 weight percent, or from about 40 weight percent to about 55 weight percent, or from about 42.5 weight percent to about 52.5 weight percent, or even from about 45 weight percent to about 50 weight percent, based on a total monomer mixture weight basis. Here, as well as elsewhere in the specification and claims, individual numerical values, or limits, from one or more embodiments and/or different ranges can be combined to form additional non-disclosed and/or non-stated ranges.

The One or More Crosslinking Compounds—Component (d):

In one embodiment, the one or more crosslinking compounds (component (d)) is selected from a monomer having at least two ethylenically unsaturated carbon-carbon double bonds. In one embodiment, the crosslinking compound (component (d)) of the present invention is selected from one or more polyunsaturated crosslinkers. In another embodiment, the crosslinking compound (component (d)) of the present invention is selected from one or more mono-unsaturated compounds carrying a reactive group that is capable of causing a formed copolymer to be crosslinked before, during, or after polymerization has taken place can also be utilized. Other useful crosslinking monomers include polyfunctional monomers containing multiple reactive groups such as epoxide groups, isocyanate groups, and hydrolyzable silane groups. In still yet another embodiment, any combination of any two or more crosslinking compounds can be utilized as component (d) of the present invention. Various polyunsaturated compounds can be utilized to generate either a partially or substantially cross-linked three dimensional network.

In another embodiment, component (d) can be selected from ester compounds having two or more, or even three or more, ester functionalities per molecule and at least two carbon-carbon double bond per molecule and/or ether compounds having two or more ether functionalities per molecule and at least two carbon-carbon-double bonds per molecule. In still another embodiment, such ester compounds and/or such ether compounds described herein can have two or more, or even three or more, carbon-carbon double bonds, or even have two or more, or even three or more, terminal carbon-carbon double bonds. Also suitable are alkenes having two or more, or even three or more, carbon-carbon double bonds, or even two or more, or even three or more, terminal carbon-carbon double bonds.

Examples of suitable polyunsaturated crosslinking monomer components include, but are not limited to, polyunsaturated aromatic monomers such as divinylbenzene, divinyl naphthalene, and trivinylbenzene; polyunsaturated alicyclic monomers, such as 1,2,4-trivinylcyclohexane; di-functional esters of phthalic acid such as diallyl phthalate; polyunsaturated aliphatic monomers, such as dienes, trienes, and tetraenes, including isoprene, butadiene, 1,5-hexadiene, 1,5,9-decatriene, 1,9-decadiene, 1,5-heptadiene; and the like.

Other suitable polyunsaturated crosslinking monomers include, but are not limited to, polyalkenyl ethers such as triallyl pentaerythritol, diallyl pentaerythritol, diallyl sucrose, octaallyl sucrose, and trimethylolpropane diallyl ether; polyunsaturated esters of polyalcohols or polyacids such as 1,6-hexanediol di(meth)acrylate, tetramethylene tri(meth)acrylate, allyl(meth)acrylate, diallyl itaconate, diallyl fumarate, diallyl maleate, trimethylolpropane tri(meth)acrylate, trimethylolpropane di(meth)acrylate, and polyethylene glycol di(meth)acrylate; alkylene bisacrylamides, such as methylene bisacrylamide, propylene bisacrylamide, and the like; hydroxy and carboxy derivatives of methylene bisacrylamide, such as N,N'-bismethylol methylene bisacrylamide; polyethyleneglycol di(meth)acrylates, such as ethyleneglycol di(meth)acrylate, diethyleneglycol di(meth)acrylate, and triethyleneglycol di(meth)acrylate; polyunsaturated silanes, such as dimethyldivinylsilane, methyltrivinylsilane, allyldimethylvinylsilane, diallyldimethylsilane, and tetravinylsilane; polyunsaturated stannanes, such as tetraallyl tin, and diallyldimethyl tin; and the like.

Useful monounsaturated compounds carrying a reactive group include N-methylolacrylamide; N-alkoxy(meth)acrylamide, wherein the alkoxy group is a $C_1$ to $C_{18}$ alkoxy; and unsaturated hydrolyzable silanes such as triethoxyvinylsilane, tris-isopropoxyvinylsilane, and 3-triethoxysilylpropyl methacrylate; and the like.

Useful polyfunctional crosslinking monomers containing multiple reactive groups include, but are not limited to, hydrolyzable silanes such as ethyltriethoxysilane and ethyltrimethoxysilane; epoxy-substituted hydrolyzable silanes, such as 2-(3,4-epoxycyclohexyl)ethyltriethoxysilane and 3-glycidoxypropyltrimethyoxysilane; polyisocyanates, such as 1,4-diisocyanatobutane, 1,6-diisocyanatohexane, 1,4-phenylenediisocyanate, and 4,4'-oxybis(phenylisocyanate); unsaturated epoxides, such as glycidyl methacrylate and allylglycidyl ether; polyepoxides, such as diglycidyl ether, 1,2,5,6-diepoxyhexane, and ethyleneglycoldiglycidyl ether; and the like.

Also useful are polyunsaturated crosslinkers derived from ethoxylated polyols, such as diols, triols and bis-phenols, ethoxylated with about 2 to about 100 moles of ethylene oxide per mole of hydroxyl functional group and end-capped with a polymerizable unsaturated group such as a vinyl ether, allyl ether, acrylate ester, methacrylate ester, and the like. Examples of such crosslinkers include bisphenol A ethoxylated dimethacrylate; bisphenol F ethoxylated dimethacrylate, ethoxylated trimethylol propane trimethacrylate, and the like. Other ethoxylated crosslinkers useful in the thickeners of the present invention include ethoxylated polyol-derived crosslinkers disclosed in U.S. Pat. No. 6,140,435, the relevant disclosure of which is incorporated herein by reference.

Examples of particularly suitable crosslinking monomers include, but are not limited to, acrylate and methacrylate esters of polyols having at least two acrylate or methacrylate ester groups, such as trimethylolpropane triacrylate (TMPTA), ethoxylated-3 trimethylolpropane triacrylate (TMPEO3TA), ethoxylated-15 trimethylolpropane triacrylate (TMPEO15TA), trimethylolpropane dimethacrylate, triethylene glycol dimethacrylate (TEGDMA), ethoxylated (30) bisphenol A dimethacrylate (EOBDMA); polyalkenyl ethers (APE) such as triallyl pentaerythritol, diallyl pentaerythritol, and trimethylolpropane diallyl ether (TMP-DAE); sucrose allyl ethers (AS) such as diallyl sucrose, octaallyl sucrose; alkylene bisacrylamides, such as methylene bisacrylamide (MBA), propylene bisacrylamide; and suitable mixtures of any two or more thereof.

In one embodiment, the carboxylic acid monomer (component (d)) comprises about 0.01 weight percent to about 5 weight percent, or from about 0.05 weight percent to about 4.5 weight percent, or from about 0.1 weight percent to about 4 weight percent, or from about 0.2 weight percent to about 3.5 weight percent, or from about 0.3 weight percent to about 3 weight percent, or from about 0.4 weight percent to about 2.5 weight percent, or from about 0.5 weight percent to about 2.25 weight percent, or from about 0.75 weight percent to about 2 weight percent, or from about 1 weight percent to about 2 weight percent, or even from about 1.25 weight percent to about 1.5 weight percent based on a total monomer mixture weight basis. Here, as well as elsewhere in the specification and claims, individual numerical values, or limits, from one or more embodiments and/or different ranges can be combined to form additional non-disclosed and/or non-stated ranges.

The Functional Monomer—Component (e):

As utilized herein, component (e) of the present invention, if present, is one or more functional monomer compounds selected from one or more hydroxy($C_1$-$C_{18}$)alkyl(meth)acrylates, one or more open chain and/or cyclic N-vinylamides (N-vinyllactams containing 4 to 9 atoms in the lactam ring moiety, wherein the ring carbon atoms optionally can be substituted by one or more lower alkyl groups such as methyl, ethyl or propyl), one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds.

Regarding the one or more amino group-containing vinyl monomers that are useful as the functional monomer compound of the present invention, such amino group-containing vinyl monomers include, but are not limited to, (meth)acrylamides, N—($C_1$-$C_{12}$)alkyl(meth)acrylamides, N,N-di($C_1$-$C_5$)alkyl(meth)acrylamides, N—($C_1$-$C_{12}$)alkylamino($C_1$-$C_5$)alkyl(meth)acrylamides, N,N-di-($C_1$-$C_5$)alkylamino($C_1$-$C_5$)alkyl(meth)acrylamides, wherein the alkyl moieties on the disubstituted amino groups can be the same or different, and wherein the alkyl moieties on the monosubstituted and disubstituted amino groups can be optionally substituted with a hydroxyl group, other monomers including, but not limited to, vinyl alcohol, vinyl imidazole, and meth(acrylonitrile). In another embodiment, mixtures of two or more of the above-mentioned amino group-containing vinyl monomers can be utilized as component (e). In another embodiment, the above amino group-containing vinyl monomers include, but are not limited to, (meth)acrylamide, diacetone acrylamide and monomers that are represented by Formulas (II) and (III):

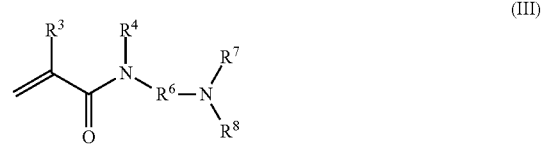

wherein Formula (II) represents a N—($C_1$-$C_{12}$)alkyl(meth)acrylamide or a N,N-di($C_1$-$C_5$)alkyl(meth)acrylamide and wherein $R^3$ is a hydrogen or methyl: $R^4$ is selected from a hydrogen, $C_1$ to $C_{12}$ alkyl, or $C_1$ to $C_{12}$ hydroxyalkyl; $R^5$ is selected from $C_1$ to $C_{12}$ alkyl or $C_1$ to $C_{12}$ hydroxyalkyl. Regarding Formula (III), Formula (III) represents a N—($C_1$-$C_{12}$)alkylamino($C_1$-$C_5$)alkyl(meth)acrylamide or a N,N-di-($C_1$-$C_5$)alkylamino($C_1$-$C_5$)alkyl(meth)acrylamide wherein $R^3$ is a hydrogen or methyl: $R^4$ is selected from a hydrogen, $C_1$ to $C_{12}$ alkyl, or $C_1$ to $C_{12}$ hydroxyalkyl; $R^6$ is selected from $C_1$ to $C_5$ alkylene; $R^7$ is selected from hydrogen or $C_1$ to $C_{12}$ alkyl; and $R^8$ is selected from $C_1$ to $C_{12}$ alkyl.

Representative N-alkyl(meth)acrylamides include, but are not limited to, N-methyl(meth)acrylamide, N-ethyl(meth)acrylamide, N-propyl(meth)acrylamide, N-isopropyl(meth)acrylamide, N-tertbutyl(meth)acrylamide, N-(2-hydroxyethyl)(meth)acryl-amide, N-(3-hydroxypropyl)(meth)acrylamide, or mixtures of any two or more thereof.

Representative N,N-dialkyl(meth)acrylamides include, but are not limited to, N,N-dimethyl(meth)acrylamide, N,N-diethyl(meth)acrylamide, N,N-(di-2-hydroxyethyl)(meth)acrylamide, N,N-(di-3-hydroxypropyl)(meth)acrylamide, N-methyl,N-ethyl(meth)acrylamide, t-butylacrylamide, t-octylacrylamide, or mixtures of any two or more thereof.

Representative N,N-dialkylaminoalkyl(meth)acrylamide include, but are not limited to, N,N-dimethylaminoethyl (meth)acrylamide, N,N-diethylaminoethyl(meth)acrylamide, N,N-dimethylaminopropyl(meth)acrylamide, or mixtures of any two or more thereof.

Regarding the one or more vinyl esters of aliphatic carboxylic acids, such vinyl esters of aliphatic carboxylic acids include, but are not limited to, vinyl esters of aliphatic carboxylic acids containing 1 to 22 carbon atoms that are represented by Formula (IV):

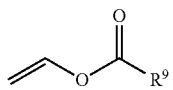

(IV)

wherein $R^9$ is a $C_1$ to $C_{22}$ aliphatic group which can be selected from a linear or branched alkyl. Representative monomer compounds of Formula (IV) include, but are not limited to, vinyl acetate, vinyl propionate, vinyl butyrate, vinyl isobutyrate, vinyl valerate, vinyl hexanoate, vinyl 2-methylhexanoate, vinyl 2-ethylhexanoate, vinyl iso-octanoate, vinyl nonanoate, vinyl neodecanoate, vinyl decanoate, vinyl undecanoate, vinyl versatate, vinyl laurate, vinyl palmitate, vinyl stearate, or mixtures of any two or more thereof.

Regarding the one or more vinyl aromatic monomers, such one or more vinyl aromatic monomers include, but are not limited to, styrene, alpha-methylstyrene, 3-methyl styrene, 4-methyl styrene, 4-propyl styrene, 4-tert-butyl styrene, 4-n-butyl styrene, 4-n-decyl styrene, vinyl naphthalene, or mixtures of any two or more thereof.

Regarding the one or more sulfonic acid group-containing monomers and/or their salts (sodium, potassium, ammonium, and triethanolamine salts), such one or more sulfonic acid group-containing monomers include, but are not limited to, vinyl sulfonic acid, 2-sulfoethyl methacrylate, styrene sulfonic acid, 2-acrylamido-2-methylpropane sulfonic acid (AMPS), allyloxybenzene sulfonic acid, or mixtures of any two or more thereof. In another embodiment, the one or more sulfonic acid group-containing monomers are selected from the sodium salt of styrene sulfonic acid (SSSA) or AMPS.

In one embodiment, the functional monomer (component (e)) comprises up to about 40 weight percent, or from about 1 weight percent to about 40 weight percent, or from about 1.5 weight percent to about 37.5 weight percent, or from about 2 weight percent to about 35 weight percent, or from about 2.5 weight percent to about 32.5 weight percent, or from about 4 weight percent to about 30 weight percent, or from about 5 weight percent to about 27.5 weight percent, or from about 7.5 weight percent to about 25 weight percent, or from about 10 weight percent to about 22.5 weight percent, or from about 12.5 weight percent to about 20 weight percent, or even from about 15 weight percent to about 17.5 weight percent, based on a total monomer mixture weight basis. Here, as well as elsewhere in the specification and claims, individual numerical values, or limits, from one or more embodiments and/or different ranges can be combined to form additional non-disclosed and/or non-stated ranges.

The Associative Hydrophobic Monomer—Component (f):

As utilized herein, component (f) of the present invention, if present, is at least one associative hydrophobic monomer, such monomers that are suitable for use in the preparation of the inventive compositions, or thickeners, are described below.

In one embodiment, associative monomers suitable for use in conjunction with the compositions, or thickeners, of the present invention are compounds that have an ethylenically unsaturated end group portion (i) for addition polymerization with the other monomers of the system; a polyoxyalkylene midsection portion (ii) for imparting selective hydrophilic properties to the product polymer; and a hydrophobic end group portion (iii) for providing selective hydrophobic properties to the polymer.

The portion (i) supplying the ethylenically unsaturated end group is, in one embodiment, derived from an α-β-ethylenically unsaturated mono or di-carboxylic acid or the anhydride thereof, or even a $C_3$ or $C_4$ mono- or di-carboxylic acid or the anhydride thereof. Alternatively, portion (i) of the associative monomer can be derived from an allyl ether or vinyl ether; a nonionic vinyl-substituted urethane monomer, such as disclosed in U.S. Reissue Pat. No. 33,156 or U.S. Pat. No. 5,294,692; or a vinyl-substituted urea reaction product, such as disclosed in U.S. Pat. No. 5,011,978; the relevant disclosures of each are incorporated herein by reference.

The midsection portion (ii) is, in one embodiment, a polyoxyalkylene segment of about 5 to about 250, or from about 10 to about 120, or even from about 15 to about 60 repeating $C_2$ to $C_7$ alkylene oxide units. In one embodiment, the midsection portions (ii) include polyoxyethylene, polyoxypropylene, and polyoxybutylene segments comprising about 5 to about 150, or from about 10 to about 100, or even from about 15 to about 60 ethylene, propylene or butylene oxide units, and random or non-random sequences of ethylene oxide, propylene oxide and or butylene oxide units.

The hydrophobic end group portion (iii) of the associative monomers is, in one embodiment, a hydrocarbon moiety belonging to one of the following hydrocarbon classes: a $C_8$ to $C_{40}$ linear alkyl, an aryl-substituted $C_2$ to $C_{40}$ alkyl, a $C_2$ to $C_{40}$ alkyl-substituted phenyl, a $C_8$ to $C_{40}$ branched alkyl, a $C_8$ to $C_{40}$ carbocyclic alkyl; and a $C_8$ to $C_{80}$ complex ester.

As used herein and in the appended claims, the term "complex ester" means a di-, tri-, or poly-ester of a polyol such as a sugar, having at least one hydroxyl group capable of being alkylated with a $C_2$ to $C_7$ alkylene oxide. The term "complex ester" includes, in particular, the complex hydrophobes described in U.S. Pat. No. 5,639,841, the relevant disclosure of which is incorporated herein by reference.

Non-limiting examples of suitable hydrophobic end group portions (iii) of the associative monomers are linear or branched alkyl groups having about 8 to about 40 carbon atoms, such as capryl ($C_8$), iso-octyl (branched $C_8$), decyl ($C_{10}$), lauryl ($C_{12}$), myristyl ($C_{14}$), cetyl ($C_{16}$), cetearyl ($C_{16}$ to $C_{18}$), stearyl ($C_{18}$), isostearyl (branched $C_{18}$), arachidyl ($C_{20}$), behenyl ($C_{22}$), lignoceryl ($C_{24}$), cerotyl ($C_{26}$), montanyl ($C_{28}$), melissyl ($C_{30}$), lacceryl ($C_{32}$), and the like.

Examples of linear and branched alkyl groups having about 8 to about 40 carbon atoms that are derived from a natural source include, without being limited thereto, alkyl groups derived from hydrogenated peanut oil, soybean oil and canola oil (all predominately $C_{18}$), hydrogenated tallow oil ($C_{16}$ to $C_{18}$), and the like; and hydrogenated $C_{10}$ to $C_{30}$ terpenols, such as hydrogenated geraniol (branched $C_{10}$), hydrogenated farnesol (branched $C_{15}$), hydrogenated phytol (branched $C_{20}$), and the like.

Non-limiting examples of suitable $C_2$ to $C_{40}$ alkyl-substituted phenyl groups include octylphenyl, nonylphenyl, decylphenyl, dodecylphenyl, hexadecylphenyl, octadecylphenyl, isooctylphenyl, sec-butylphenyl, and the like.

Suitable $C_8$ to $C_{40}$ carbocylic alkyl groups include, without being limited thereto, groups derived from sterols from animal sources, such as cholesterol, lanosterol, 7-dehydrocholesterol, and the like; from vegetable sources, such as phytosterol, stigmasterol, campesterol, and the like; and from yeast sources, such as ergosterol, mycosterol, and the like. Other carbocyclic alkyl hydrophobic end groups useful in the present invention include, without being limited thereto, cyclooctyl, cyclododecyl, adamantyl, decahydronaphthyl, and groups derived from natural carbocyclic materials, such as pinene, hydrogenated retinol, camphor, isobornyl alcohol, and the like.

Exemplary aryl-substituted $C_2$ to $C_{40}$ alkyl groups include, without limitation thereto, styryl (e.g., 2-phenylethyl), distyryl (e.g., 2,4-diphenylbutyl), tristyryl (e.g., 2,4,6-triphenylhexyl), 4-phenylbutyl, 2-methyl-2-phenylethyl, tristyrylphenolyl, and the like.

Non-limiting examples of suitable $C_8$ to $C_{80}$ complex esters include hydrogenated castor oil (predominately the triglyceride of 12-hydroxystearic acid); 1,2-diacyl glycerols, such as 1,2-distearyl glycerol, 1,2-dipalmityl glycerol, 1,2-dimyristyl glycerol, and the like; di-, tri-, or poly-esters of sugars, such as 3,4,6-tristearyl glucose, 2,3-dilauryl fructose, and the like; and sorbitan esters, such as those disclosed in U.S. Pat. No. 4,600,761, the pertinent disclosures of which are incorporated herein by reference.

Useful associative monomers can be prepared by any method known in the art. See, for example, U.S. Pat. No. 4,421,902; U.S. Pat. No. 4,384,096; U.S. Pat. No. 4,514,552; U.S. Pat. No. 4,600,761; U.S. Pat. No. 4,616,074; U.S. Pat. No. 5,294,692; U.S. Pat. No. 5,292,843; U.S. Pat. No. 5,770,76; and U.S. Pat. No. 5,412,142; the pertinent disclosures of which are incorporated herein by reference.

Examples of suitable associative monomers include, but are not limited to, those having Formula (V).

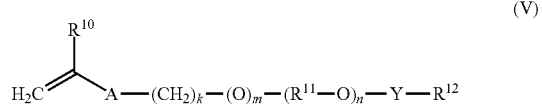

(V)

wherein each $R^{10}$ is independently hydrogen, methyl, —C(O)OH, or —C(O)OR$^{13}$; R$^{13}$ is $C_1$ to $C_m$ alkyl; A is —CH$_2$C(O)O—, —C(O)O—, —O—, —CH$_2$O—, —NHC(O)NH—, —C(O)NH—, —Ar—(CE$_2$)$_z$-NHC(O)O—, —Ar—(CE$_2$)$_z$-NHC(O)NH—, or —CH$_2$CH$_2$NHC(O)—; Ar is a divalent aryl; E is a hydrogen or methyl; z is 0 or 1; k is an integer in the range of 0 to about 30, and m is 0 or 1, with the proviso that when k is 0, m is 0, and when k is in the range of 1 to about 30, m is 1; (R$^{11}$—O)$_n$ is a polyoxyalkylene, which is a homopolymer, a random copolymer, or a block copolymer of $C_2$ to $C_4$ oxyalkylene units, wherein R$^{11}$ is $C_2H_4$, $C_3H_6$, or $C_4H_8$, and n is an integer in the range of about 5 to about 250, or from about 5 to about 100, or from about 10 to about 80, or even from about 15 to about 60; Y is —R$^{11}$O—, —R$^{11}$NH—, —O(O)—, —C(O)NH—, —R$^{11}$NHC(O)NH—, or —C(O)NHC(O)—; R$^{12}$ is a substituted or unsubstituted alkyl selected from the group consisting of a $C_8$ to $C_{40}$ linear alkyl, a $C_8$ to $C_{40}$ branched alkyl, a $C_8$ to $C_{40}$ carbocyclic alkyl, a $C_2$ to $C_{40}$ alkyl-substituted phenyl, an aryl-substituted $C_2$ to $C_{40}$ alkyl, and a $C_8$ to $C_{80}$ complex ester; wherein the R$^{12}$ alkyl group optionally comprises one or more substituents selected from a hydroxyl group, an alkoxyl group, and a halogen group.

Suitable associative monomers of Formula (V) include cetyl polyethoxylated methacrylate (OEM), cetearyl polyethoxylated methacrylate (CSEM), stearyl polyethoxylated (meth)acrylate, arachidyl polyethoxylated (meth)acrylate, behenyl polyethoxylated methacrylate (BEM), cerotyl polyethoxylated (meth)acrylate, montanyl polyethoxylated (meth)acrylate, melissyl polyethoxylated (meth)acrylate, lacceryl polyethoxylated (meth)acrylate, tristyrylphenol polyethoxylated methacrylate (TEM), hydrogenated castor oil polyethoxylated methacrylate (HCOEM), canola polyethoxylated (meth)acrylate, and cholesterol polyethoxylated methacrylate (CHEM), where the polyethoxylated portion of the monomer comprises about 5 to about 100, or from about 10 to about 80, or even from about 15 to about 60 ethylene oxide repeating units. Here, as well as elsewhere in the specification and claims, individual numerical values, or limits, from one or more embodiments and/or different ranges can be combined to form additional non-disclosed and/or non-stated ranges.

When utilized, the associative hydrophobic monomer (component (f)) comprises up to about 25 weight percent, or from about 0.1 weight percent to about 25 weight percent, or from about 0.2 weight percent to about 22.5 weight percent, or from about 0.5 weight percent to about 20 weight percent, or from about 1 weight percent to about 17.5 weight percent, or even from about 1.5 weight percent to about 15 weight percent, based on a total monomer mixture weight basis. Here, as well as elsewhere in the specification and claims, individual numerical values, or limits, from one or more embodiments and/or different ranges can be combined to form additional non-disclosed and/or non-stated ranges.

The Chain Transfer Agent—Component (g):

As utilized herein, component (g) of the present invention, if present, is at least one chain transfer agent, such chain transfer agents that are suitable for use in the preparation of the inventive compositions, or thickeners, are described below.

Suitable chain transfer agents for use in this invention include, but are not limited to, a variety of thio and disulfide containing compounds, such as $C_1$ to $C_{18}$ alkyl mercaptans, mercaptocarboxylic acids, mercaptocarboxylic esters, thioesters, $C_1$ to $C_{18}$ alkyl disulfides, aryldisulfides, polyfunctional thiols, and the like; phosphites and hypophosphites; haloalkyl compounds, such as carbon tetrachloride, bromotrichloromethane, and the like; metal chelates and the like; unsaturated chain transfer agents, such as alpha-methylstyrene; or suitable combinations of ay two or more thereof.

Polyfunctional thiols include trifunctional thiols, such as trimethylolpropane-tris-(3-mercaptopropionate), tetrafunctional thiols, such as pentaerythritol-tetra-(3-mercaptopropionate), pentaerythritol-tetra-(thioglycolate), and pentaerythritol-tetra-(thiolactate); hexafunctional thiols, such as dipentaerythritol-hexa-(thioglycolate); and the like.

Alternatively, the chain transfer agent can be any catalytic chain transfer agent which reduces molecular weight of addition polymers during free radical polymerization of vinyl monomers. Examples of catalytic chain transfer agents include, for example, cobalt complexes (e.g., cobalt (II) chelates) and/or copper complexes. Catalytic chain transfer agents can often be utilized in relatively low concentrations relative to thiol-based CTAS.

Examples of suitable chain transfer agents include, but are not limited to, octyl mercaptan, n-dodecyl mercaptan (DDM), t-dodecyl mercaptan, hexadecyl mercaptan, octadecyl mercaptan (ODM), isooctyl 3-mercaptopropionate (IMP), butyl 3-mercaptopropionate, 3-mercaptopropionic acid, butyl thioglycolate, isooctyl thioglycolate, dodecyl thioglycolate, and the like.

When utilized, the chain transfer agent (component (g)) comprises up to about 5 weight percent, or from about 0.1 weight percent to about 5 weight percent, or from about 0.2 weight percent to about 4.5 weight percent, or from about 0.3 weight percent to about 4 weight percent, or from about 0.4 weight percent to about 3.5 weight percent, or from about 0.5 weight percent to about 3 weight percent, or even from about 0.6 weight percent to about 2.5 weight percent, based on a total monomer mixture weight basis. Here, as well as elsewhere in the specification and claims, individual numerical values, or limits, from one or more embodiments and/or different ranges can be combined to form additional non-disclosed and/or non-stated ranges.

Emulsion Polymerization Stabilizers:

In another embodiment, the present invention relates to a polymer that is the reaction product of the polymerization of a monomer mixture comprising: (i) components (a), (b), (c), and (d); (ii) components (a), (b), (c), (d) and (e); (iii) components (a), (b), (c), (d) and (f); (iv) components (a), (b), (c), (d) and (g); (v) components (a), (b), (c), (d), (e) and (f); (vi) components (a), (b), (c), (d), (e) and (g); (vii) components (a), (b), (c), (d), (f) and (g); and/or (viii) components (a), (b), (c), (d), (e), (f) and (g) and at least one suitable polymeric stabilizers (also known as protective colloids) for an emulsion polymerization process. Suitable polymeric stabilizers for the emulsion polymerization process of this invention are water-soluble polymers, including, but not limited to, synthetic polymers, such as polyvinyl alcohol, partially hydrolyzed polyvinyl acetate, polyvinylpyrrolidone, polyacrylamide, polymethacrylamide, carboxylate-functional addition polymers, polyalkyl vinyl ethers and the like; water-soluble natural polymers, such as gelatin, pectins, alginates, casein, starch, and the like; and modified natural polymers, such as methylcellulose, hydroxypropylcellulose, carboxymethylcellulose, allyl modified hydroxyethylcellulose, and the like. In some cases, it can be of advantage to use mixtures of a synthetic and a natural protective colloid, for example, a mixture of polyvinyl alcohol and casein. Further, suitable natural polymers are mixed ethers such as methylhydroxyethylcellulose and carboxymethylmethylcellulose. If present, the one or more polymeric stabilizers can be utilized in amounts up to about 2 weight percent based on the total emulsion weight for the emulsion polymerization process. When utilized, in another embodiment the one or more polymeric stabilizers are present in the range of about 0.0001 to about 5 weight percent, or even from about 0.01 to about 3.0 weight percent based on the total emulsion weight for the emulsion polymerization process.

The polymeric stabilizers which are used according to this invention are termed water-soluble when they are miscible in water in any proportion or have a solubility in 20° C. water of at least about 0.1 weight percent and do not precipitate from these aqueous solutions on dilution with water at the foregoing temperature. The molecular weight of the water-soluble synthetic polymeric stabilizers is typically in the range of about 5,000 to about 2,000,000, or even from about 25,000 to about 1,500,000 Daltons. The viscosity of aqueous solutions of the polymeric stabilizers is typically in the range of about 1 to about 10,000 mPa·s at a concentration of about 2 weight percent to about 10 weight percent and a temperature of about 20° C.

Thickener Compositions and Methods for Producing Same:

It should be noted that any suitable polymerization method known in the art can be utilized to form the thickener compositions of the present invention. As such, the present invention is not limited any one type of polymerization reaction and various methods of polymerization can be utilized in conjunction with the present invention. Such methods include various polymerization methods that are known to those of skill in the art including, but not limited to, emulsion polymerization processes, front-loaded polymerization methods, batchwise or metered polymerization methods, various premix mixtures of two or more components can be reacted together in parallel or any suitable combination.

The emulsion polymerization can be carried out in a batch process, in a metered monomer addition process, or the polymerization can be initiated as a batch process and then the bulk of the monomers can be continuously metered into the reactor (seed process). Typically, the polymerization process is carried out at a reaction temperature in the range of about 20° C. to about 99° C., however, higher or lower temperatures can be used. To facilitate emulsification of the monomer mixture, the emulsion polymerization is carried out in the presence of at least one surfactant. In one embodiment, the emulsion polymerization is carried out in the presence of surfactant ranging in the amount of about 1 weight percent to about 10 weight percent, or from about 3 weight percent to about 8 weight percent, or even from about 3.5 weight percent to about 7 weight percent, based on a total emulsion weight basis. The emulsion polymerization reaction mixture also includes one or more free radical initiators which are present in an amount in the ranging from about 0.01 weight percent to about 3 weight percent based on total monomer weight. The polymerization can be performed in an aqueous or aqueous alcohol medium. Surfactants for facilitating the emulsion polymerization include anionic, nonionic, amphoteric, and cationic surfactants, as well as mixtures thereof. Most commonly, anionic and nonionic surfactants can be utilized as well as mixtures thereof.

Suitable anionic surfactants for facilitating emulsion polymerizations are well known in the art and include, but are not limited to, sodium lauryl sulfate, sodium dodecyl benzene sulfonate, sodium ($C_6$ to $C_{16}$) alkyl phenoxy benzene sulfonate, disodium ($C_6$ to $C_{16}$) alkyl phenoxy benzene sulfonate, disodium ($C_6$ to $C_{16}$) di-alkyl phenoxy benzene sulfonate, disodium laureth-3 sulfosuccinate, sodium dioctyl sulfosuccinate, sodium di-sec-butyl naphthalene sulfonate, disodium dodecyl diphenyl ether sulfonate, disodium n-octadecyl sulfosuccinate, phosphate esters of branched alcohol ethoxylates, fatty acid soaps (including, but not limited to, the sodium, potassium, ammonium, and triethanolamine salts of a saturated and unsaturated fatty acids containing from about 8 to about 22 carbon atoms), and the like. Mixtures of any two or more of the above anionic surfactants and/or even two or more fatty acid soaps can also be utilized.

Nonionic surfactants suitable for facilitating emulsion polymerizations are well known in the polymer art, and include, but are not limited to, linear or branched $C_8$ to $C_{30}$ fatty alcohol ethoxylates, such as capryl alcohol ethoxylate, lauryl alcohol ethoxylate, myristyl alcohol ethoxylate, cetyl alcohol ethoxylate, stearyl alcohol ethoxylate, cetearyl alcohol ethoxylate, sterol ethoxylate, oleyl alcohol ethoxylate, and, behenyl alcohol ethoxylate; alkylphenol alkoxylates, such as octylphenol ethoxylates; and polyoxyethylene polyoxypropylene block copolymers, and the like. Additional fatty alcohol ethoxylates suitable as non-ionic surfactants are described below. Other useful nonionic surfactants include, but are not limited to, $C_8$ to $C_{22}$ fatty acid esters of polyoxyethylene glycol, ethoxylated mono- and diglycerides, sorbitan esters and ethoxylated sorbitan esters, $C_8$ to $C_{22}$ fatty acid glycol esters, block copolymers of ethylene oxide and propylene oxide, and combinations thereof. The number of ethylene oxide units in each of the foregoing ethoxylates can, in one embodiment, be 2 or more ethylene oxide units, or even from 2 to about 150 ethylene oxide units.

Exemplary free radical initiators include, but are not limited to, water-soluble inorganic persulfate compounds, such as ammonium persulfate, potassium persulfate, and sodium persulfate; peroxides such as hydrogen peroxide, benzoyl peroxide, acetyl peroxide, and lauryl peroxide; organic hydroperoxides, such as cumene hydroperoxide and t-butyl hydroperoxide; organic peracids, such as peracetic acid; and oil soluble, free radical producing agents, such as 2,2'-azobisisobutyronitrile, and the like, and mixtures thereof. Peroxides and peracids can optionally be activated with reducing agents, such as sodium bisulfite, sodium formaldehyde, or ascorbic acid, transition metals, hydrazine, and the like. In one embodiment, suitable free-radical polymerization initiators include, but are not limited to, water soluble azo polymerization initiators, such as 2,2'-azobis(tert-alkyl) compounds having a water solubilizing substituent on the alkyl group. In one embodiment, azo polymerization catalysts include the Vazo® free-radical polymerization initiators, available from DuPont, such as Vazo® 44 (2,2'-azobis(2-(4,5-dihydroimidazolyl)propane), Vazo® 56 (2,2'-azobis(2-methylpropionamidine)dihydrochloride), and Vazo® 68 (4,4'-azobis(4-cyanovaleric acid)).

Optionally, other emulsion polymerization additives and processing aids which are well known in the emulsion polymerization art, such as auxiliary emulsifiers, solvents, buffering agents, chelating agents, inorganic electrolytes, polymeric stabilizers, biocides, and pH adjusting agents can be included in the polymerization system, or systems, of the present invention.

In one embodiment, an auxiliary emulsifying aid selected from an ethoxylated $C_{10}$ to $C_{22}$ fatty alcohol (or their mixtures) can be added to the polymerization medium. In one embodiment, the fatty alcohol contains from about 5 to about 250 moles of ethoxylation, or from about 8 to 100 moles of ethoxylation, or even from about 10 to 50 moles of ethoxylation. Exemplary ethoxylated fatty alcohols include, but are not limited to, lauryl alcohol ethoxylate, myristyl alcohol ethoxylate, cetyl alcohol ethoxylate, stearyl alcohol ethoxylate, cetearyl alcohol ethoxylate, sterol ethoxylate, oleyl alcohol ethoxylate, and behenyl alcohol ethoxylate. In another embodiment, suitable ethoxylated fatty alcohols include Ceteth-20, Ceteareth-20, and Steareth-20, Behenth-25, and mixtures of any two or more thereof.

If utilized, the amount of ethoxylated fatty alcohol can range from about 0.1 weight percent to about 10 weight percent, or from about 0.5 weight percent to about 8 weight percent, or even from about 1 weight percent to about 5 weight percent, based on the total weight percent of the monomers present in the polymerization medium.

In a typical emulsion polymerization, a mixture of the monomers is added to a first reactor under inert atmosphere to a solution of emulsifying surfactant (e.g., anionic surfactant) in water. Optional processing aids can be added as desired (e.g., auxiliary emulsifier(s)). The contents of the reactor are agitated to prepare a monomer emulsion. To a second reactor equipped with an agitator, an inert gas inlet, and feed pumps are added under inert atmosphere a desired amount of water and additional anionic surfactant and optional processing aids. The contents of the second reactor are heated with mixing agitation. After the contents of the second reactor reaches a temperature in the range of about 55° C. to about 98° C., a free radical initiator is injected into the so formed aqueous surfactant solution in the second reactor, and the monomer emulsion from the first reactor is gradually metered into the second reactor over a period typically ranging from about one half to about four hours. The reaction temperature is controlled in the range of about 45° C. to about 95° C. After completion of the monomer addition, an additional quantity of free radical initiator can optionally be added to the second reactor, and the resulting reaction mixture is typically held at a temperature of about 45° C. to about 95° C. for a time period sufficient to complete the polymerization reaction to obtain an emulsion of acrylic copolymer thickeners.

Surfactants:

In one embodiment, an embodiment of the present invention relates to stable, aqueous compositions comprising a rheology modifier and a surfactant(s). Suitable surfactants include anionic, cationic, amphoteric, and nonionic surfactants, as well as mixtures thereof. Such compositions are useful in personal care cleansing compositions that contain various components such as substantially insoluble materials requiring suspension or stabilization (e.g., a silicone, an oily material, a pearlescent material, aesthetic and cosmeceutical beads and particles, gaseous bubbles, exfoliants, and the like). The invention further relates to the incorporation of acidic materials before or after the addition of an alkaline material to reduce the pH of the composition without negatively impacting the viscosity, rheological, and clarity properties of the composition.

The anionic surfactant can be any of the anionic surfactants known or previously used in the art of aqueous surfactant compositions. Suitable anionic surfactants include but are not limited to alkyl sulfates, alkyl ether sulfates, alkyl sulphonates, alkaryl sulfonates, α-olefin-sulphonates, alkylamide sulphonates, alkarylpolyether sulphates, alkylamidoether sulphates, alkyl monoglyceryl ether sulfates, alkyl monoglyceride sulfates, alkyl monoglyceride sulfonates, alkyl succinates, alkyl sulfosuccinates, alkyl sulfosuccinamates, alkyl ether sulphosuccinates, alkyl amidosulfosuccinates; alkyl sulphoacetates, alkyl phosphates, alkyl ether phosphates, alkyl ether carboxylates, alkyl amidoethercarboxylates, N-alkylamino acids, N-acyl amino acids, alkyl peptides, N-acyl taurates, alkyl isethionates, carboxylate salts wherein the acyl group is derived from fatty acids; and the alkali metal, alkaline earth metal, ammonium, amine, and triethanolamine salts thereof.

In one embodiment, the cation moiety of the forgoing salts is selected from sodium, potassium, magnesium, ammonium, mono-, di- and triethanolamine salts, and mono-, di-, and tri-isopropylamine salts. The alkyl and acyl groups of the foregoing surfactants contain from about 6 to about 24 carbon atoms in one embodiment, from 8 to 22 carbon atoms in another embodiment and from about 12 to 18 carbon atoms in a further embodiment and may be unsaturated. The aryl groups in the surfactants are selected from phenyl or benzyl. The ether containing surfactants set forth above can contain from 1 to 10 ethylene oxide and/or propylene oxide units per surfactant molecule in one embodiment, and from 1 to 3 ethylene oxide units per surfactant molecule in another embodiment.

Examples of suitable anionic surfactants include sodium, potassium, lithium, magnesium, and ammonium salts of laureth sulfate, trideceth sulfate, myreth sulfate, $C_{12}$ to $C_{13}$ pareth sulfate, $C_{12}$ to $C_{14}$ pareth sulfate, and $C_{12}$ to $C_{15}$ pareth sulfate, ethoxylated with 1, 2, and 3 moles of ethylene oxide; sodium, potassium, lithium, magnesium, ammonium, and triethanolamine lauryl sulfate, coco sulfate, tridecyl sulfate, myrstyl sulfate, cetyl sulfate, cetearyl sulfate, stearyl sulfate, oleyl sulfate, and tallow sulfate, disodium lauryl sulfosuccinate, disodium laureth sulfosuccinate, sodium cocoyl isethionate, sodium $C_{12}$ to $C_{14}$ olefin sulfonate, sodium laureth-6 carboxylate, sodium methyl cocoyl taurate, sodium cocoyl glycinate, sodium myristyl sarcocinate, sodium dodecylbenzene sulfonate, sodium cocoyl sarcosinate, sodium cocoyl glutamate, potassium myristoyl glutamate, triethanolamine monolauryl phosphate, and fatty acid soaps, including the sodium, potassium, ammonium, and triethanolamine salts of a saturated and unsaturated fatty acids containing from about 8 to about 22 carbon atoms.

The cationic surfactants can be any of the cationic surfactants known or previously used in the art of aqueous surfactant compositions. Suitable classes of cationic surfactants include but are not limited to alkyl amines, alkyl imidazolines, ethoxylated amines, quaternary compounds, and quaternized esters. In addition, alkyl amine oxides can function as a cationic surfactant at a low pH.

Alkylamine surfactants can be salts of primary, secondary and tertiary fatty $C_{12}$ to $C_{22}$ alkylamines, substituted or unsubstituted, and substances sometimes referred to as "amidoamines." Non-limiting examples of alkylamines and salts thereof include dimethyl cocamine, dimethyl palmitamine, dioctylamine, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, dimethyl lauramine, stearylamine hydrochloride, soyamine chloride, stearylamine formate, N-tallowpropane diamine dichloride, and amodimethicone (INCI name for a silicone polymer and blocked with amino functional groups, such as aminoethylamino propylsiloxane).

Non-limiting examples of amidoamines and salts thereof include stearamido propyl dimethyl amine, stearamidopropyl dimethylamine citrate, palmitamidopropyl diethylamine, and cocamidopropyl dimethylamine lactate.

Non-limiting examples of alkyl imidazoline surfactants include alkyl hydroxyethyl imidazoline, such as stearyl hydroxyethyl imidazoline, coco hydroxyethyl imidazoline, ethyl hydroxymethyl oleyl oxazoline, and the like.

Non-limiting examples of ethyoxylated amines include PEG-cocopolyamine, PEG-15 tallow amine, quaternium-52, and the like.

Among the quaternary ammonium compounds useful as cationic surfactants, some correspond to the general formula: $(R^9R^{10}R^{11}R^{12}N^+)$ $E^-$, wherein $R^9$, $R^{10}$, $R^{11}$, and $R^{12}$ are independently selected from an aliphatic group having from 1 to about 22 carbon atoms, or an aromatic, alkoxy, polyoxyalkylene, alkylamido, hydroxyalkyl, aryl or alkylaryl group having 1 to about 22 carbon atoms in the alkyl chain; and E is a salt-forming anion such as those selected from halogen, (e.g., chloride, bromide), acetate, citrate, lactate, glycolate, phosphate, nitrate, sulfate, and alkylsulfate. The aliphatic groups can contain, in addition to carbon and hydrogen atoms, ether linkages, ester linkages, and other groups such as amino groups. The longer chain aliphatic groups, e.g., those of about 12 carbons, or higher, can be saturated or unsaturated. In one embodiment, the aryl groups are selected from phenyl and benzyl.

Exemplary quaternary ammonium surfactants include, but are not limited to, cetyl trimethylammonium chloride, cetylpyridinium chloride, dicetyl dimethyl ammonium chloride, dihexadecyl dimethyl ammonium chloride, stearyl dimethyl benzyl ammonium chloride, dioctadecyl dimethyl ammonium chloride, dieicosyl dimethyl ammonium chloride, didocosyl dimethyl ammonium chloride, dihexadecyl dimethyl ammonium chloride, dihexadecyl dimethyl ammonium acetate, behenyl trimethyl ammonium chloride, benzalkonium chloride, benzethonium chloride, and di(coconutalkyl)dimethyl ammonium chloride, ditallowedimethyl ammonium chloride, di(hydrogenated tallow)dimethyl ammonium chloride, di(hydrogenated tallow)dimethyl ammonium acetate, ditallowedimethyl ammonium methyl sulfate, ditallow dipropyl ammonium phosphate, and ditallow dimethyl ammonium nitrate.

At low pH, amine oxides can protonate and behave similarly to N-alkyl amines. Examples include, but are not limited to, dimethyldodecylamine oxide, oleyldi(2-hydroxyethyl) amine oxide, dimethyltetradecylamine oxide, di(2-hydroxyethyl)-tetradecylamine oxide, dimethylhexadecylamine oxide, behenamine oxide, cocamine oxide, decyltetradecylamine oxide, dihydroxyethyl $C_{12}$ to $C_{15}$ alkoxypropylamine oxide, dihydroxyethyl cocamine oxide, dihydroxyethyl lauramine oxide, dihydroxyethyl stearamine oxide, dihydroxyethyl tallowamine oxide, hydrogenated palm kernel amine oxide, hydrogenated tallowamine oxide, hydroxyethyl hydroxypropyl $C_{12}$ to $C_{15}$ alkoxypropylamine oxide, lauramine oxide, myristamine oxide, cetylamine oxide, oleamidopropylamine oxide, oleamine oxide, palmitamine oxide, PEG-3 lauramine oxide, dimethyl lauramine oxide, potassium trisphosphonomethylamine oxide, soyamidopropylamine oxide, cocamidopropylamine oxide, stearamine oxide, tallowamine oxide, and mixtures thereof.

Amphoteric or zwitterionic surfactants are molecules that contain acidic and basic moieties and have the capacity of behaving either as an acid or a base. Suitable surfactants can be any of the amphoteric surfactants known or previously used in the art of aqueous surfactant compositions. Exemplary amphoteric surfactant classes include but are not limited to amino acids (e.g., N-alkyl amino acids and N-acyl amino acids), betaines, sultaines, and alkyl amphocarboxylates.

Amino acid based surfactants suitable in the practice of the present invention include surfactants represented by the formula:

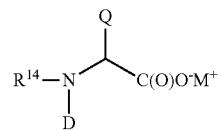

wherein $R^{14}$ represents a saturated or unsaturated hydrocarbon group having 10 to 22 carbon atoms or an acyl group containing a saturated or unsaturated hydrocarbon group having 9 to 22 carbon atoms, D is hydrogen or methyl, Q is selected from hydrogen, $-CH_3$, $-CH(CH_3)_2$, $-CH_2CH(CH_3)_2$, $-CH(CH_3)CH_2CH_3$, $-CH_2C_6H_5$, $-CH_2OH$, $-CH_2C_6H_4OH$, $-CH(OH)CH_3$, $-(CH_2)_4NH_2$, $-(CH_2)_3NHC(NH)NH_2$, $-CH_2C(O)O^-M^+$, $-(CH_2)_2C(O)O^-M^+$. M is a salt forming cation. In one embodiment, $R^{13}$ represents a radical selected from a linear or branched $C_{10}$ to $C_{22}$ alkyl group, a linear or branched $C_{10}$ to $C_{22}$ alkenyl group, an acyl group represented by $R^{14}C(O)$—, wherein $R^{14}$ is selected from a linear or branched $C_9$ to $C_{22}$ alkyl group, a linear or branched $C_9$ to $C_{22}$ alkenyl group. In one embodiment, $M^+$ is selected from sodium, potassium, ammonium, and triethanolamine (TEA).

The amino acid surfactants can be derived from the alkylation and acylation of α-amino acids such as, for example, alanine, arginine, aspartic acid, glutamic acid, glycine, isoleucine, leucine, lysine, phenylalanine, serine, tyrosine, and valine. Representative N-acyl amino acid surfactants are, but not limited to the mono- and di-carboxylate salts (e.g., sodium, potassium, ammonium and TEA) of N-acylated glutamic acid, for example, sodium cocoyl glutamate, sodium lauroyl glutamate, sodium myristoyl glutamate, sodium palmitoyl glutamate, sodium stearoyl glutamate, disodium cocoyl glutamate, disodium stearoyl glutamate, potassium cocoyl glutamate, potassium lauroyl glutamate, and potassium myristoyl glutamate; the carboxylate salts (e.g., sodium, potassium, ammonium and TEA) of N-acylated alanine, for example, sodium cocoyl alaninate, and TEA lauroyl alaninate; the carboxylate salts (e.g., sodium, potassium, ammonium and TEA) of N-acylated glycine, for example, sodium cocoyl glycinate, and potassium cocoyl glycinate; the carboxylate salts (e.g., sodium, potassium, ammonium and TEA) of N-acylated sarcosine, for example, sodium lauroyl sarcosinate, sodium cocoyl sarcosinate, sodium myristoyl sarcosinate, sodium oleoyl sarcosinate, and ammonium lauroyl sarcosinate; and mixtures of the foregoing surfactants.

The betaines and sultaines useful in the present invention are selected from alkyl betaines, alkylamino betaines, and alkylamido betaines, as well as the corresponding sulfobetaines (sultaines) represented by the formulas:

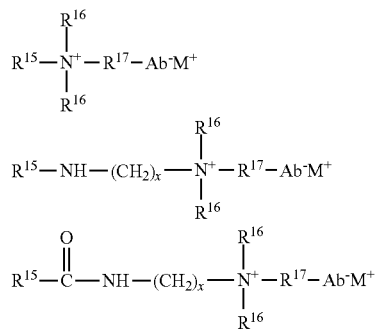

wherein $R^{15}$ is a $C_7$ to $C_{22}$ alkyl or alkenyl group, each $R^{16}$ independently is a $C_1$ to $C_4$ alkyl group, $R^{17}$ is a $C_1$ to $C_5$ alkylene group or a hydroxy substituted $C_1$ to $C_5$ alkylene group, n is an integer from 2 to 6, Ab is a carboxylate or sulfonate group, and M is a salt forming cation. In one embodiment, $R^{15}$ is a $C_{11}$ to $C_{18}$ alkyl group or a $C_{11}$ to $C_{18}$ alkenyl group. In one embodiment, $R^{16}$ is methyl. In one embodiment, $R^{17}$ is methylene, ethylene or hydroxy propylene. In one embodiment, x is 3. In a further embodiment, M is selected from sodium, potassium, magnesium, ammonium, and mono-, di- and triethanolamine cations.

Examples of suitable betaines include, but are not limited to, lauryl betaine, coco betaine, oleyl betaine, cocohexadecyl dimethylbetaine, lauryl amidopropyl betaine, cocoamidopropyl betaine, and cocamidopropyl hydroxysultaine.

The alkylamphocarboxylates such as the alkylamphoacetates and alkylamphopropionates (mono- and disubstituted carboxylates) can be represented by the formula:

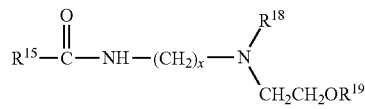

wherein $R^{15}$ is a $C_7$ to $C_{22}$ alkyl or alkenyl group, $R^{18}$ is $-CH_2CH(OH)CH_2SO_3^-M^+$, $-CH_2CH_2C(O)O^-M^+$, $-CH_2C(O)O^-M^+$, or $R^{19}$ is a hydrogen or $-CH_2C(O)O^-$ $M^+$, x is an integer from 2 to 6, or in another instance x is 3, and M is a cation selected from sodium, potassium, magnesium, ammonium, and mono-, di- and triethanolamine.

Exemplary alkylamphocarboxylates include, but are not limited to, sodium cocoamphoacetate, sodium lauroamphoacetate, sodium capryloamphoacetate, disodium cocoamphodiacetate, disodium lauroamphodiacetate, disodium caprylamphodiacetate, disodium capryloamphodiacetate, disodium cocoamphodipropionate, disodium lauroamphodipropionate, disodium caprylamphodipropionate, and disodium capryloamphodipropionate.

The nonionic surfactant can be any of the nonionic surfactants known or previously used in the art of aqueous surfactant compositions. Suitable nonionic surfactants include, but are not limited to, aliphatic ($C_6$-$C_{18}$) primary or secondary linear or branched chain acids, alcohols or phenols; alkyl ethoxylates; alkyl phenol alkoxylates (especially ethoxylates and mixed ethoxy/propoxy moieties); block alkylene oxide condensates of alkyl phenols; alkylene oxide condensates of alkanols; and ethylene oxide/propylene oxide block copolymers. Other suitable nonionic surfactants include mono- or dialkyl alkanolamides; alkyl polyglucosides (APGs); sorbitan fatty acid esters; polyoxyethylene sorbitan fatty acid esters; polyoxyethylene sorbitol esters; polyoxyethylene acids, and polyoxyethylene alcohols. Other examples of suitable nonionic surfactants include coco mono- or diethanolamide, coco glucoside, decyl diglucoside, lauryl diglucoside, coco diglucoside, polysorbate 20, 40, 60, and 80, ethoxylated linear alcohols, cetearyl alcohol, lanolin alcohol, stearic acid, glyceryl stearate, PEG-100 stearate, laureth 7, and oleth 20.

In another embodiment, non-ionic surfactants include, but are not limited to, alkoxylated methyl glucosides such as, for example, methyl gluceth-10, methyl gluceth-20, PPG-10 methyl glucose ether, and PPG-20 methyl glucose ether, available from Lubrizol Advanced Materials, Inc., under the trade names, Glucam® E10, Glucam® E20, Glucam® P10, and Glucam® P20, respectively; and hydrophobically modified alkoxylated methyl glucosides, such as PEG 120 methyl glucose dioleate, PEG-120 methyl glucose trioleate, and PEG-20 methyl glucose sesquistearate, available from Lubrizol Advanced Materials, Inc., under the trade names, Glucamate® DOE-120, Glucamate™ LT, and Glucamate™ SSE-20, respectively, are also suitable. Other exemplary hydrophobically modified alkoxylated methyl glucosides are disclosed in U.S. Pat. Nos. 6,573,375 and 6,727,357, the disclosures of which are hereby incorporated by reference in their entirety.

Other surfactants which can be utilized in the present invention are set forth in more detail in WO 99/21530; U.S. Pat. No. 3,929,678; U.S. Pat. No. 4,565,647; U.S. Pat. No. 5,720,964; and U.S. Pat. No. 5,858,948, of which the pertinent disclosures of which are incorporated herein by reference. In addition, suitable surfactants are also described in *McCutcheon's Emulsifiers and Detergents* (North American and International Editions, by Schwartz, Perry and Berch), which is hereby fully incorporated by reference.

While the amounts of the surfactant utilized in a composition, or thickener, comprising the invention can vary widely depending on a desired application, the amounts which are often utilized generally range from about 1 percent to about 80 percent by weight in one embodiment, from about 3 percent to about 65 percent weight in another embodiment, from about 5 percent to about 30 percent by weight in a still another embodiment, from about 6 percent to about 20 percent by weight in a further embodiment, and from about 8 percent to about 16 percent by weight, based upon the total weight of the personal care, home care, health care, and institutional and industrial care composition in which it is included.

In one embodiment of the invention, the personal care, home care, health care and I&I care compositions of the invention comprise a thickener in combination with at least one anionic surfactant. In another embodiment of the invention, the compositions comprise a thickener with at least one anionic surfactant and at least one amphoteric surfactant. In one embodiment, the anionic surfactant is selected from alkyl sulfates, alkyl ether sulfates, alkyl sulphonates, alkaryl sulfonates, alkarylpolyether sulphates, and mixtures thereof wherein the alkyl group contains 10 to 18 carbon atoms, the aryl group is a phenyl, and the ether group contains 1 to 10 moles of ethylene oxide. Representative anionic surfactants include, but are not limited to, sodium and ammonium lauryl ether sulfate (ethoxylated with 1, 2, and 3 moles of ethylene oxide), sodium, ammonium, and triethanolamine lauryl sulfate.

In one embodiment, the amphoteric surfactant is selected from an alkyl betaine, an alkylamino betaine, an alkylamido betaines, and mixtures thereof. Representative betaines include but are not limited to lauryl betaine, coco betaine, cocohexadecyl dimethylbetaine, cocoamidopropyl betaine, cocoamidopropylhyrdoxy sultaine, and mixtures thereof.

The personal care, home care, health care and I&I care compositions comprising the thickener of the invention can be formulated at pH ranges from about 0.5 to about 13.5. The desired pH for the compositions of the present invention is obviously dependent upon the specific end product applications. Generally, personal care applications have a desired pH range of about 3 to about 12.5 in one embodiment, and from about 3.5 to about 12 in another embodiment. Surprisingly, the thickener/surfactant compositions of the invention when formulated at low pH values give a clear formulation with desirable rheology properties (e.g., viscosity and yield values). In another embodiment, the thickener/surfactant compositions of the invention when formulated at neutral pH values of about 7 and below give a clear formulation with desirable rheology properties of the compositions in which they are included. In still another embodiment, the thickener/surfactant compositions of the invention when formulated at pH values of about 9.5 and below give a clear formulation while maintaining desirable rheology properties of the compositions in which they are included.

Generally, home care applications have a desired pH range of about 1 to about 12 in one embodiment, and from about 3 to about 13 in another embodiment, depending on the desired end-use application.

The pH of the compositions of the present invention can be adjusted with any combination of acidic and/or basic pH adjusting agents known to the art. The thickener rheology modifiers of the present invention are generally supplied in their acidic form. These polymers modify the rheology of a formulation through the neutralization of the carboxyl groups on the polymer with an alkaline material. Without wishing to be bound by theory, this causes ionic repulsion between like charged moieties along the backbone of the polymer and a three dimensional expansion of the polymer network, resulting in an increase in viscosity and other rheological properties.

In one embodiment, compositions comprising the thickeners of the invention can be acidified (pH reduction) without neutralizing the polymer. In another embodiment, compositions comprising the thickeners of the present invention can be neutralized with an alkaline material. In a further embodiment, compositions comprising the thickeners of the present invention can be neutralized subsequent to being acidified. In a still further embodiment, compositions comprising the thickeners of the present invention can be acidified subsequent to neutralization.

An alkaline material is incorporated to neutralize the polymer and can be referred to as a neutralizing agent or pH adjusting agent. Many types of neutralizing agents can be used in the present invention, including inorganic and organic bases, and combinations thereof. Examples of inorganic bases include but are not limited to the alkali metal hydroxides (especially sodium, potassium, and ammonium), and alkali metal salts of inorganic acids, such as sodium borate (borax), sodium phosphate, sodium pyrophosphate, and the like; and mixtures thereof. Examples of organic bases include but are not limited to triethanolamine (TEA), diisopropanolamine, triisopropanolamine, aminomethyl propanol, dodecylamine, cocamine, oleamine, morpholine, triamylamine, triethylamine, tetrakis(hydroxypropyl)ethylenediamine, L-arginine, aminomethyl propanol, tromethamine (2-amino 2-hydroxymethyl-1,3-propanediol), and PEG-15 cocamine. Alternatively, other alkaline materials can be used alone or in combination with the above mentioned inorganic and organic bases. Such materials include surfactants, surfactant mixtures, pre-neutralized surfactants or materials that when combined in a composition containing the thickeners of the present invention is capable of neutralizing or partially neutralizing the carboxyl groups on the thickener composition backbone. Any material capable of increasing the pH of the composition is suitable.

Various acidic materials can be utilized as a pH adjusting agent in the present invention. Such acidic materials include organic acids and inorganic acids, for example, acetic acid, citric acid, tartaric acid, alpha-hydroxy acids, beta-hydroxy acids, salicylic acid, lactic acid, glycolic acid, and natural fruit acids, or inorganic acids, for example, hydrochloric acid, nitric acid, sulfuric acid, sulfamic acid, phosphoric acid, and combinations thereof. As discussed above, the addition of the acidic pH adjusting agent can be incorporated before or after the addition of the basic pH adjusting agent in a desired composition. The addition of the acidic material after the addition of the alkaline neutralizing agents yields significantly improved rheological properties. This is discussed in greater detail under the "back acid" formulation technique below.

As with the alkaline pH adjusting agents, other acidic materials can be used alone or in combination with the above mentioned inorganic and organic acids. Such materials include materials which when combined in a composition containing a thickener of the invention is capable of reducing the pH of the composition. It will be recognized by the skilled artisan that the various acidic pH adjusting agents can, in one embodiment, serve more than one function. For example, acidic preservative compounds and acid based cosmeceutical compounds (e.g., alpha- and beta-hydroxy acids) not only serve their primary preservative and cosmeceutical functions, respectively, they can also be utilized to reduce or maintain the pH of a desired formulation.

Buffering agents can be used in the compositions of the invention. Suitable buffering agents include, but are not limited to, alkali or alkali earth metal carbonates, phosphates, bicarbonates, citrates, borates, acetates, acid anhydrides, succinates, and the like, such as sodium phosphate, sodium citrate, sodium acetate, sodium bicarbonate, and sodium carbonate.

The pH adjusting agent and/or buffering agent is utilized in any amount necessary to obtain and/or maintain a desired pH value in the composition.

Back Acid Formulation:

The polymeric rheology modifiers of the present invention do not start to build substantial viscosity until a pH of about 5 or 6 is achieved. There are some Home and Personal Care applications, however, that require a pH of less than 6 for optimal and desired performance. This has limited the use of such polymers in such compositions. Additionally, it is difficult to even formulate stable applications at this lower pH range.

It has been found that if these compositions are raised to a near neutral or even alkaline pH and then subsequently reduced in pH, the viscosity and yield value generally remain unchanged or often actually increase. This formulating technique will be herein referred to as "Back Acid" thickening or "Back Acid Addition." This formulating technique broadens the scope of application of the present polymers and now allows for formulation in the acidic pH regime. Additionally, the process of "Back Acid" thickening can also be used to further increase the viscosity and stability of compositions formulated in the slightly acidic and in the alkaline pH regime.

The one or more thickeners of the invention can be formulated into a desired composition in any order during the formulation procedure. An alkaline material is added and mixed to increase the pH of the composition to at least about 5 in one embodiment, to at least about 6 in another embodiment, and most to at least about 6.5 in a further embodiment. The alkaline material can be any compound that can neutralize a thickener composition of the present invention to a specified pH. In one embodiment, the alkaline material is selected from any of the alkaline pH adjusting agents described above, such as, for example, sodium hydroxide, potassium hydroxide, triethanolamine, or another fatty acid amine neutralizing agent commonly used in said applications. Alternatively, other alkaline materials can be used, such as surfactants. In one embodiment, the pH can be adjusted to at least about 0.5, 1, 1.5 or 2 pH units above the final target pH of the composition. In another embodiment, the pH can be adjusted to at least 3, 4, or even 5 pH units above the final target pH of the composition. Subsequent to the pH adjustment with the alkaline material, an acidic material is added to reduce the pH of the composition to the desired target pH for the composition. In one embodiment of the invention, the target pH ranges from about 3.5 to about 6, from about 4 to about 5.5 in another embodiment, and from about 4.5 to 5 in a further embodiment.

The material used to decrease the pH of the composition can be any acidic material. In one embodiment, the acidic material is selected from any of the acidic pH adjusting agents described above, such as, for example, an organic acid, such as citric acid, acetic acid, alpha-hydroxy acid, beta-hydroxy acid, salicylic acid, lactic acid, glycolic acid, natural fruit acids, or combinations thereof. In addition, inorganic acids, for example, hydrochloric acid, nitric acid, sulfuric acid, sulfamic acid, phosphoric acid, and combinations thereof can be utilized. Mixtures of organic acids and inorganic acids are also contemplated.

The thickeners of the present invention can be formulated with or without at least one surfactant. Such compositions can comprise any combination of optional additives, adjuvants, and benefit agents suitable for a desired personal care, home care, health care, and institutional and industrial care product known in the art. The choice and amount of each optional component employed will vary with the purpose and character of the end product, and can be readily determined by one skilled in the formulation art and from the literature. It is recognized that various additive, adjuvant, and benefit agents and components set forth herein can serve more than one function in a composition, such as, for example, surfactants, emulsifiers, solubilizers, conditioners, emollients, humectants, lubricants, pH adjusting agents, and preservatives.

While overlapping weight ranges for the various components and ingredients that can be contained in the compositions of the invention have been expressed for selected embodiments and aspects of the invention, it should be readily apparent that the specific amount of each component in the disclosed personal care, home care, health care, and I&I care compositions will be selected from its disclosed range such that the amount of each component is adjusted such that the sum of all components in the composition will total 100 weight percent The amounts employed will vary with the purpose and character of the desired product and can be readily determined by one skilled in the formulation art and from the literature.

Optional additives and adjuvants include, but are not limited to insoluble materials, pharmaceutical and cosmeceutical actives, chelators, conditioners, diluents, solvents, fragrances, humectants, lubricants, solubilizers, emollients, opacifiers, colorants, anti-dandruff agents, preservatives, spreading aids, emulsifiers, sunscreens, fixative polymers, botanicals, viscosity modifiers, and the like, as well as the numerous other optional components for enhancing and maintaining the properties of a desired personal care, home care, health care, and I&I care composition.

Compositions for personal care and topical health care can comprise any cosmetic, toiletry, and topical pharmaceutical formulation that require rheology modification or thickening known from the cosmetic and pharmaceutical literature. Typical personal care formulations that can include the compositions, or thickeners, of the present invention as a rheology modifier include, without being limited thereto, shampoos, chemical and non-chemical hair curling and hair straightening products, hair style maintenance products, emulsion lotions and creams for the nails, hands, feet, face, scalp, and body, hair dyes, face and body makeup, nail care products, astringents, deodorants, antiperspirants, depilatories, skin-protective creams and lotions, such as sunscreens, skin and body cleansers, skin conditioners, skin toners, skin firming compositions, liquid soaps, soap bars, bath products, shaving products, and the like. Formulated compositions for topical health care that are applied to the skin and mucous membranes for cleansing or soothing are compounded with many of the same physiologically tolerable cosmetic ingredients and chemically inert ingredients employed for personal care products in the same product forms, differing primarily in the purity grade of ingredients and by the presence of topically active medicaments. For example, topical health care products include oral hygiene products, such as toothpastes, oral suspensions, and mouth care products, which can be classified as pharmaceuticals or over-the-counter products, and include pharmacosmetics, which contain phytopharmaceutic or nutraceutical ingredients.

Compositions for personal care and topical health care can be in the form of, without being limited thereto, liquids, such as rinses, gels, sprays, emulsions, such as lotions and creams, shampoos, pomades, foams, ointments, tablets, sticks, such as lip care products, makeup, and suppositories, and like products, which are applied to skin and hair and remain in contact therewith until removed as by rinsing with water or washing with shampoo or soap. Gels can be soft, stiff, or squeezable. Emulsions can be oil-in-water, water-in-oil, or multiphase. Sprays can be non-pressurized aerosols delivered from manually pumped finger-actuated sprayers or can be pressurized aerosols. The compositions, or thickeners, of the present invention can be formulated in an aerosol composition, such as in a spray, mousse, or foam forming formulation, where a chemical or gaseous propellant is required. Physiologically and environmentally tolerable propellants, such as compressed gases, fluorinated hydrocarbons and liquid volatile hydrocarbons, and the amounts and suitable combinations to be used, are well known in the cosmetic and pharmaceutical art and literature.

An extensive listing of personal care and cosmetic ingredients and their functions, for example, appears in the INCI Dictionary, generally, and in Vol. 2, Section 4 of the Seventh Edition, in particular, incorporated herein by reference. Those skilled in the art of formulating personal care and health care products recognize that some ingredients are multifunctional and, hence, can serve more than one purpose in the formulation. Thus, the amount of compositions, or thickeners, of the present invention polymer employed as a personal care or health care product component is not limited, as long as the purpose and properties of the formulated composition performs its intended function.

Typical household care, and I&I care products that can contain thickener compositions, or thickeners, of the present invention as a rheology modifier include, without being limited thereto, surface cleansers for kitchen and bathroom counter tops, tiled surfaces, and utilities, including appliances employed or located therein, toilet cleaners, including toilet bowl rim gels, floor cleansers, wall cleansers, polishes, air freshener gels, detergents, treatments and cleansers for dishes and laundry, such as fabric softener, spot reducer, fabric treatments, and the like.

The compositions, or thickeners, of the present invention are suitable for use as rheology modifiers in industrial processes and applications. For example, the compositions, or thickeners, of the present invention can be employed in textile treatments as processing and finishing aids for textile coating, printing and finishing formulations, inks, metal cleaners, scale removers, paint and varnish strippers, polishes for furniture, shoes, cars, or metal, and the like.

Thus, compositions containing compositions, or thickeners, of the present invention can be in any form, including but not limited to, a liquid, a gel, a spray, an emulsion, a semisolid, such as a paste, a solid, such as a stick, tablet or bar, and the like, so long as the composition is useful for its intended function.

If desired, the clarity and/or appearance of the personal care, home care, health care, and institutional and industrial care compositions of the invention can be adjusted. The clarity of the compositions may vary from substantially transparent with little visual haze where insoluble component additives such as beads, air bubbles, pearlizing agents, are clearly visible to visually opaque. Visually distinct, multiple phase compositions where one phase is clear and another phase is opaque are also envisioned. In one embodiment of the invention, a pattern comprising phases that are visually distinct from each other may be formed by mixing clear and opaque components. The visual distinction between each phase can be in color, texture, density, and the type of insoluble component or benefit agent contained therein. The specific pattern can be chosen from a wide variety of patterns, including, but not limited to striping, marbling, geometrics, spirals, and combinations thereof. Compositions of this invention demonstrate excellent stability with time in suspending insoluble components and/or benefit agents and stabilizing the visually distinct phases. Multiple-phase compositions are disclosed in United States Published Patent Application Nos. 2006/0079417, 2006/0079418, 2006/0079419, 2006/0079420, 2006/0079421, 2006/0079422, 2007/0009463, 2007/0072781, 2007/0280976, and 2008/0317698 to the Proctor and Gamble Company. The entireties of all of these published patent applications are incorporated herein by reference. The thickeners of the invention are suitable to provide phase stability to the multi-phase compositions disclosed therein.

Methods:

A. Viscosity:

The reported viscosity of each polymer containing composition is measured in milli-Pascal seconds (mPa·s), employing a Brookfield rotating spindle viscometer, (Brookfield, Model RVT) at 20 revolutions per minute (rpm), at ambient room temperature of about 20° C. to about 25° C. (referred to as Brookfield viscosity).

A "thin or low viscosity" typically refers to a pourable, runny product having a viscosity of up to about 1,000 mPa·s; a "medium viscosity" refers to a product having a viscosity in the range of above 1,000 to about 3,000 mPa·s; a "high viscosity" refers to a product having a viscosity in the range of above 3,000 to about 10,000 mPa·s; and "gel" refers to a product having a viscosity greater than 10,000 mPa·s, unless otherwise indicated.

B. Clarity:

When reported, the clarity of the polymer-containing composition is measured in percent T (transmittance) by Brinkmann PC 920 colorimeter at least about 24 hours after the composition is made. Clarity measurements are taken against deionized water (clarity rating of 100 percent). Compositions having a clarity of about 60 percent or more are substantially clear; compositions having a clarity in the range of about 45 percent to 59 percent are judged substantially translucent.

C. Turbidity:

When reported, the turbidity of a polymer-containing composition is determined in Nephelometric Turbidity Units (NTU) employing a Nephelometric turbidity meter with distilled water (NTU=0) as the standard. Compositions having an NTU value of about 90 or greater are judged turbid.

D. Molecular Weight Determination:

The molecular weights referenced herein are measured by GPC using a Waters 2000 with Refractive Index detector GPC instrument manufactured by Waters Corporation, Massachusetts, USA. Approximately 0.05 grams polymer sample is dissolved in 5 mL of dimethyl actamide (DMAc), containing 250 ppm of butylated hydroxytoluene (BHT) and 0.02 molar $NaNO_3$. The test sample solution is gently shaken for about two hours and filtered by passing the sample solution through a 0.45 μm PTFE disposable disc filter. The chromatographic conditions are: Mobile phase: DMAc, with 250 ppm BHT and 0.02 m $NaNO_3$, 100° C., 1.0 ml/min. Sample size: 350 μL Column set: PLgel (Guard+2× Mixed-A), all 10 μm, in series. Waters Empower3 Pro LC/GPC software is used to analyze the results and to calculate molecular weight polymer compounds of the present invention.

E. Yield Value:

Yield Value, also referred to as Yield Stress, is defined as the initial resistance to flow under stress. It is measured by the Brookfield Yield Value (BYV) Extrapolation Method using a Brookfield viscometer (Model RVT) at ambient room temperature of about 20 to 25° C. The Brookfield viscometer is used to measure the torque necessary to rotate a spindle through a liquid sample at speeds of 0.5 to 100 rpm. Multiplying the torque reading by the appropriate constant for the spindle and speed gives the apparent viscosity. Yield Value is an extrapolation of measured values to a shear rate of zero. The BYV is calculated by the following equation:

$$BYV, dyn/cm^2 = (\eta_{\alpha 1} - \eta_{\alpha 2})/100$$

where $\eta_{\alpha1}$ and $\eta_{\alpha2}$=apparent viscosities obtained at two different spindle speeds (0.5 rpm and 1.0 rpm, respectively). These techniques and the usefulness of the Yield Value measurement are explained in Technical Data Sheet Number 244 (Revision: 5/98) from Noveon Consumer Specialties of Lubrizol Advanced Materials, Inc., herein incorporated by reference.

F. Suspension Testing Procedure:

Suspension is tested using the clear bath gel samples. A six dram vial is filled with a bath gel sample. Beads (Unisphere UEA-509, composition: lactose, cellulose, hydroxypropyl methylcellulose) are added and dispersed into the sample with a thin stick. Dispersion could be affected by viscosity. The vials are placed in a 45° C. oven and periodically checked for bead movement. The suspension results are ranked using a zero to 4 scale where: 0=Fail; 1=approximately 5.

EXAMPLES

The following examples further illustrate the preparation and use of embodiments but are not intended to be limiting. The following is a list of material abbreviations and Trade Names utilized in the specification.

EA ethyl acrylate
MAA methacrylic acid
nBA n-butyl acrylate
MA methyl acrylate
2-EHA 2-ethylhexyl acrylate
MMA methyl methacrylate
HEMA hydroxyethyl methacrylate
VeoVa-9 vinyl neononanoate (also VV-9)
VeoVa-10 vinyl neodecanoate (also VV-10)
St styrene
VP vinyl pyrrolidone
V-Cap vinyl caprolactam
AA acrylic acid
FA fumaric acid
ITA itaconic acid
TMPTA trimethylolpropane triacrylate
TMPDAE trimethylolpropane diallylether
TEGDMA triethylene glycol dimethacrylate
TMPTMA trimethylolpropane trimethacrylate
TAC triallyl cyanurate
TMPTA-15EO ethoxylated trimethylolpropane triacrylate
AMA allyl methacrylate
EGDMA ethylene glycol dimethacrylate
HDODA 1,6-hexanediol diacrylate
DVB divinyl benzene
TMP-1 2,4,4-trimethyl-1-pentene
1-OCT 1-octene
AO-12 1-dodecene
LIM limonene
SLS sodium lauryl sulfate
tBHP t-butyl hydroperoxide Example 1

The following example demonstrates a polymerization process with front-loaded olefin. Into an agitator equipped first reactor containing 168 grams of deionized water (D.I.), 20.0 grams of sodium lauryl sulfate (30 percent active in water weight/weight), 360.6 grams of ethyl acrylate, 207 grams of methacrylic acid, 1.8 gram of TMPTA, and 0.6 gram of TMPDAE are added under nitrogen atmosphere and mixed at 500 rpms to form a monomer emulsion. To an agitator equipped second reactor are added 960 grams of deionized water, 1.9 grams of sodium lauryl sulfate (30 percent active in water weight/weight), and 30.0 grams of TMP-1. The contents of the second reactor are heated to about 88° C. with mixing agitation (200 rpm) under a nitrogen atmosphere. When the contents of the second reactor reaches a temperature of approximately 88° C., 14.7 grams of an ammonium persulfate solution (2.0 percent aqueous solution weight/weight) is injected into the heated surfactant solution. The monomer emulsion from the feed reactor is gradually metered at a feed rate of 5.05 grams/minute. into the second reactor over a period of 150 minutes at a reaction temperature maintained at approximately 88° C. After 30 minutes, 0.24 percent ammonium persulfate solution (aqueous solution weight/weight) is also metered at 0.75 mL/minute into the reaction mixture in the second reactor along with the emulsion monomer feed. The temperature of the reaction is maintained at about 88° C. for an additional two and half hours to complete the polymerization. The resulting polymer emulsion product is cooled to room temperature, discharged from the reactor and recovered.

Examples 1a Through 37

Polymers 1a through 37 are also synthesized as set forth in Example 1. The monomer components for these Examples are set forth in Tables 1 and 1a below.

TABLE 1

Monomer Components with Different Olefins

| Example No. | TMP-1 | 1-Oct | AO-12 | LIM | EA | MAA | TMPTA | TMPDAE | TEGDMA |
|---|---|---|---|---|---|---|---|---|---|
| 1a | 5.00 | | | | 60.2 | 34.50 | 0.30 | | |
| 2 | 5.00 | | | | 69.6 | 25.00 | 0.30 | 0.10 | |
| 3 | 5.00 | | | | 57.6 | 37.00 | 0.30 | 0.10 | |
| 4 | 5.00 | | | | 54.6 | 40.00 | 0.30 | 0.10 | |
| 5 | 5.00 | | | | 44.2 | 50.00 | 0.60 | 0.20 | |
| 6 | 2.50 | | | | 62.6 | 34.50 | 0.40 | | |
| 7 | 7.50 | | | | 57.6 | 34.50 | 0.40 | | |
| 8 | 10.00 | | | | 54.9 | 34.50 | 0.60 | | |
| 8a | 10.00 | | | | 55.2 | 34.50 | 0.30 | | |
| 9 | 10.00 | | | | 54.9 | 34.50 | 0.50 | | 0.1 |
| 10 | | 5.00 | | | 60.2 | 34.50 | 0.30 | | |
| 11 | | | 5.00 | | 60.2 | 34.50 | 0.30 | | |
| 12 | | | | 5.00 | 60.1 | 34.50 | 0.30 | 0.10 | |
| 13 | 4.00 | | | 1.00 | 60.1 | 34.50 | 0.30 | 0.10 | |

All amounts are in weight percent of the total amount of the reaction charge.

TABLE 1a

Monomer Components with Different Co-Monomers or Cross-Linkers

| Example No. | TMP-1 | EA | MAA | Co-Monomer Type | Co-Monomer Concen. | TMPTA | TMPDAE | Co-XL Type | Co-XL Concen. |
|---|---|---|---|---|---|---|---|---|---|
| 14 | 5.00 | 55.1 | 34.50 | nBA | 5.00 | 0.30 | 0.10 | | |
| 15 | 5.00 | 50.1 | 34.50 | MA | 10.00 | 0.30 | 0.10 | | |
| 16 | 5.00 | 55.1 | 34.50 | EHA | 5.00 | 0.30 | 0.10 | | |
| 17 | 5.00 | 55.1 | 34.50 | MMA | 5.00 | 0.30 | 0.10 | | |
| 18 | 5.00 | 55.1 | 34.50 | HEMA | 5.00 | 0.30 | 0.10 | | |
| 19 | 5.00 | 59.1 | 34.50 | VV-9 | 1.00 | 0.30 | 0.10 | | |
| 20 | 5.00 | 55.1 | 34.50 | VV-10 | 5.00 | 0.30 | 0.10 | | |
| 21 | 5.00 | 55.1 | 34.50 | Sty | 5.00 | 0.30 | 0.10 | | |
| 22 | 5.00 | 60.0 | 32.50 | VP | 2.00 | 0.30 | 0.10 | | |
| 23 | 5.00 | 59.1 | 34.50 | V-Cap | 1.00 | 0.30 | 0.10 | | |
| 24 | 5.00 | 58.1 | 34.50 | V-Cap | 2.00 | 0.30 | 0.10 | | |
| 25 | 5.00 | 55.1 | 34.50 | V-Cap | 5.00 | 0.30 | 0.10 | | |
| 26 | 5.00 | 60.1 | 32.50 | AA | 2.00 | 0.30 | 0.10 | | |
| 27 | 5.00 | 60.1 | 29.50 | AA | 5.00 | 0.30 | 0.10 | | |
| 28 | 5.00 | 60.1 | 33.50 | FA | 1.00 | 0.30 | 0.10 | | |
| 29 | 5.00 | 60.1 | 33.50 | ITA | 1.00 | 0.30 | 0.10 | | |
| 30 | 5.00 | 60.04 | 34.50 | | | | | TMPTMA | 0.46 |
| 31 | 5.00 | 60.6 | 34.50 | | | | | TAC | 0.34 |
| 32 | 5.00 | 59.43 | 34.50 | | | | 0.10 | TMPTA-15EO | 0.97 |
| 33 | 5.00 | 60.14 | 34.50 | | | 0.30 | | AMA | 0.06 |
| 34 | 5.00 | 60.07 | 34.50 | | | 0.30 | | TEGDMA | 0.13 |
| 34a | 5.00 | 60.0 | 34.50 | | | 0.30 | | TEGDMA | 0.20 |
| 35 | 5.00 | 60.11 | 34.50 | | | 0.30 | | EGDMA | 0.09 |
| 36 | 5.00 | 60.09 | 34.50 | | | 0.30 | | HDODA | 0.11 |
| 37 | 5.00 | 60.12 | 34.50 | | | 0.30 | | DVB | 0.08 |

All amounts are in weight percent of the total amount of the reaction charge.

Example 38

Example 38 is also synthesized as set forth in Example 1 except TMP-1 is metered in less than 10 minutes into the second reactor 50 minutes after initiation as delayed addition of olefin.

Example 39

A polymerization process with olefin pulsed addition is demonstrated in Example 39. It is also prepared as set forth in Example 38 except TMP-1 is metered into the second reactor for about 60 minutes 5 minutes after initiation instead of 50 minutes.

Control 1—Polymer with Low MAA Content (WO 2009/082640):

The Control-1 Example is based on WO2009/082640 and it contains low MAA content. Into an agitator equipped first reactor containing 175 grams of deionized water (D.I.), 16.94 grams of FES 32 (31 percent active in water weight/weight), 1.7 grams of sodium bicarbonate, 705 grams of ethyl acrylate, and 7.5 grams of methacrylic acid are added under nitrogen atmosphere and mixed at 500 rpm to form a monomer emulsion. To an agitator equipped second reactor are added 565 grams of deionized water, 1.21 grams of FES 32 (31 percent active in water weight/weight), 0.9 grams of sodium bicarbonate, and 37.5 grams of TMP-1. The contents of the second reactor are heated to about 78° C. with mixing agitation (200 rpm) under a nitrogen atmosphere. When the contents of the second reactor reaches a temperature of approximately 78° C., 21.5 grams of an ammonium persulfate solution (7.5 percent aqueous solution weight/weight) is injected into the heated surfactant solution. The monomer emulsion from the feed reactor is gradually metered at a feed rate of 5.03 grams/minute into the second reactor over a period of 180 minutes at a reaction temperature maintained at approximately 78° C. After 45 minutes, 2.72 percent ammonium persulfate solution (aqueous solution weight/weight) is also metered at 0.6 mL/minute into the reaction mixture in the second reactor along with the emulsion monomer feed. The temperature of the reaction is maintained at about 78° C. for an additional one and half hours to complete the polymerization. A mixture of 7.0 grams of $FeSO_4$ (0.15 percent) and 1.44 grams of 1 percent Versene can be added as post initiator solutions along with 13.5 grams of 8.75 percent tBHP and 12.8 grams of 6.25 percent erythorbic acid at about 57° C. The resulting polymer emulsion product is cooled to room temperature after 20 minutes, discharged from the reactor and recovered.

Example 40

This Example describes the gel properties made from the polymers of Examples 1a, 8a, 11, and 34a. These gels are made as mucilages of 2.5 weight percent total polymer solids in water and neutralized to pH values ranging from 6.9 to 7.3 with 20 percent NaOH. Gel properties (Brookfield viscosity, yield value, and turbidity) are measured and listed in Table 2a along with a Control 1 polymer with a low MAA content and a commercial control sample (Commercial Control 2=Carbopol® Aqua SF-1) which are also identically formulated for comparison. Regarding Carbopol® Aqua SF-1 (INCI name—Acrylates Copolymer), this compound is a crosslinked copolymer of two or more monomers consisting of acrylic acid, methacrylic acid, and one of their $C_1$ to $C_4$ alkyl esters. Olefin modified inventive polymers provide thickening properties with good clarity while Control 1 with low MAA (less than 10 weight percent) gave no thickening efficiency. Also olefin modified inventive polymers show improved thickening properties when compared to Commercial Control 2 sample.

TABLE 2

| Example No. | pH | Viscosity (mPa·s) | Yield Value (dynes/cm$^2$) | Turbidity (NTU) |
|---|---|---|---|---|
| Control 1 (WO2009/082640) | 7.0 | <100 | 0 | Opaque |
| Commercial Control 2 (Aqua SF-1) | 6.91 | 9,300 | 890 | 11.6 |
| 1a | 7.13 | 34,000 | 4,420 | 9.6 |
| 8a | 7.27 | 37,800 | 4,540 | 7.8 |
| 11 | 7.13 | 14,500 | 570 | 9.2 |
| 34a | 7.19 | 14,500 | 1,110 | 4.4 |

Examples 41 to 51 demonstrate the surfactant compatibility of the olefin modified inventive polymers.

Example 41

Examples 1 through 9 and 14 through 38 are separately formulated into a clear body wash cleansing composition comprising a blend of an anionic and amphoteric surfactant. The formulation components are set forth in Table 3. Each component (except component numbers 12, 13, and 14) is added to a mixing vessel in the order listed in the table. Components 12, 13, and 14 are formulated into the body wash samples during the testing procedure described below. The solubilizer (component 8) and fragrance (component 9) are premixed before addition to the vessel. The components are blended under mild agitation until a homogeneous body wash master batch formulation is obtained.

TABLE 3

Clear Body Wash Formulation

| Component No. | Component | Amount (weight percent) | Function |
|---|---|---|---|
| 1 | Deionized Water | q.s. to 100 | Diluent |
| 2 | Polymer of Example Nos. 1 through 9 and 14 through 38 (30 percent active polymer solids) | 8.00 | Rheology Modifier |
| 3 | Sulfochem ™ ES-2 CWK Surfactant (26 percent active) | 40.00 | Detersive Surfactant |
| 4 | Chembetaine ™ CAD Surfactant (35 percent active) | 6.70 | Amphoteric Surfactant |
| 5 | Merquat ® Plus Polymer (10 percent active) | 2.10 | Conditioning Polymer |
| 6 | Tetrasodium EDTA | 0.05 | Chelating Agent |
| 7 | Phenonip ® | 0.50 | Antibacterial |
| 8 | Tween 20 | 0.50 | Fragrance Solubilizer |
| 9 | Fragrance | 0.50 | Fragrance |
| 10 | FD&C Blue No. 1 | 1.85 | Dye |
| 11 | FD&C Yellow No. 6 | 0.85 | Dye |
| 12 | NaOH (18 percent aqueous weight/weight) | q.s. to pH | pH adjusting agent |
| 13 | Citric Acid (50 percent aqueous weight/weight) | q.s. to pH | pH adjusting agent |
| 14 | Lipopearl ™ 0293 Beads | 1.0 | Vitamin E Delivery Beads |

The pH of each of the body wash formulations is increased with NaOH (component 12) to a pH value of approximately 6.2 to 6.7 and then it is transferred into 4 ounce jars (100 grams) and 6 dram (20 grams) vials, respectively, and centrifuged to remove any entrained air bubbles. Viscosity measurements are carried out on the 100 gram samples and turbidity measurements are completed on the 20 grams samples. The data are presented in Table 4 and 4a. The test formulation samples of the polymers of Examples 1, 22, 24, 26 through 29, and 33 through 38 are subsequently evaluated for their ability to suspend cosmetic beads at 45° C. for duration of 12 weeks as described in test protocol set forth above. All polymers passed following 12 weeks in the aging oven. The data are presented in Table 4a.

TABLE 4

| Example No. | pH | Viscosity (mPa·s) | Turbidity, NTU |
|---|---|---|---|
| 2 | 6.6 | 5,550 | 50.4 |
| 3 | 6.4 | 9,350 | — |
| 4 | 6.3 | 8,950 | 19.7 |
| 5 | 6.2 | 2,760 | 7.75 |
| 6 | 6.4 | 3,890 | 11.2 |
| 7 | 6.6 | 8,050 | 26.8 |
| 8 | 6.6 | 7,200 | 33.7 |
| 9 | 6.7 | 6,800 | 29.6 |
| 14 | 6.5 | 7,300 | 29.1 |
| 15 | 6.5 | 7,400 | 19.5 |
| 16 | 6.5 | 13,300 | 39.0 |
| 17 | 6.5 | 6,950 | 27.5 |
| 18 | 6.4 | 7,100 | 22.8 |
| 19 | 6.6 | 8,300 | 30.1 |
| 20 | 6.5 | 11,200 | 42.3 |
| 21 | 6.5 | 9,600 | 39.0 |
| 23 | 6.4 | 6,550 | 25.3 |
| 25 | 6.4 | 7,200 | 24.9 |
| 30 | 6.6 | 9,250 | 29.8 |
| 31 | 6.5 | 1,420 | 53.3 |
| 32 | 6.6 | 7,750 | 41.2 |

TABLE 4a

| Example No. | pH | Viscosity (mPa·s) | Turbidity (NTU) | Bead Suspension |
|---|---|---|---|---|
| Control 2 | 6.5 | 4,170 | 10 | 3 |
| 1 | 6.4 | 7,750 | Clear liquid | 3 |
| 22 | 6.6 | 8,500 | 35.3 | 3 |
| 24 | 6.5 | 10,800 | 37.4 | 3 |
| 26 | 6.5 | 12,000 | 32.5 | 3 |
| 27 | 6.5 | 8,500 | 21.3 | 3 |
| 28 | 6.6 | 16,100 | 26.8 | 3 |
| 29 | 6.6 | 15,000 | 34.8 | 3 |
| 33 | 6.6 | 11,700 | 36.4 | 3 |
| 34 | 6.5 | 8,550 | 30.8 | 3 |
| 35 | 6.7 | 9,700 | 30.6 | 3 |
| 36 | 6.5 | 9,550 | 33.2 | 3 |
| 37 | 6.6 | 8,950 | 27.4 | 3 |
| 38 | 6.6 | 11,100 | 37.4 | 3 |

Example 42

The polymers of Examples 1 and 14 through 19 are each formulated into a clear bath gel cleansing composition comprising a sodium based anionic surfactant and an amphoteric surfactant. A food grade preservative, sodium benzoate, is added in place of alkyl parabens. The formulation components are set forth in Table 5. Components 1 through 11 are added to a vessel with mixing in the order listed in the table. Components 12, 13, and 14 are added to the bath gel formulations during the testing procedure described below. The fragrance (component 7) and solubilizer (component 8) are premixed before addition to the vessel. The components are blended under gentle agitation until a homogeneous bath gel master batch mixture is obtained.

TABLE 5

Clear Bath Gel Formulated With Food Grade Preservative

| Component No. | Component | Amount (weight percent) | Function |
|---|---|---|---|
| 1 | Deionized Water | q.s. to 100 | Diluent |
| 2 | Polymer of Example Nos. 1 and 14 through 19 (30 percent active polymer solids) | 8.00 | Rheology Modifier |
| 3 | Sulfochem ™ ES-2 CWK Surfactant (28 percent active) | 40.00 | Detersive Surfactant |
| 4 | Chembetaine ™ CAD Surfactant (35 percent active) | 6.70 | Amphoteric Surfactant |
| 5 | Merquat ® Plus | 2.10 | Conditioning Polymer |
| 6 | Tetrasodium EDTA | 0.05 | Chelating Agent |
| 7 | Fragrance | 0.50 | Fragrance |
| 8 | Tween 20 | 0.50 | Fragrance Solubilizer |
| 9 | FD&C Blue No. 1 | 1.85 | Dye |
| 10 | FD&C Yellow No. 6 | 0.85 | Dye |
| 11 | NaOH (18 percent) | q.s. to pH 6.5 | pH Adjusting Agent |
| 12 | Citric Acid (50 percent aqueous weight/weight) | q.s. to pH | pH Adjusting Agent |
| 13 | Sodium Benzoate | 0.50 | Preservative |
| 14 | Lipopearl ™ Beads | 1.0 | Vitamin E Delivery Vehicle |

The pH of each master batch formulation is adjusted to 6.5 with NaOH (component 11), and then reduced with citric acid (component 12) to an interim pH value of 5.0. Sodium benzoate (component 13) is added to each sample before additional citric acid is added to achieve the final pH value of 4.0.

Example 43

The polymers of Examples 1 and 14 through 19 are separately formulated into a clear conditioning shampoo composition comprising an ammonium based anionic surfactant, an amphoteric surfactant and a subsequently added pearlizing agent. The formulation is prepared from the components listed in Table 6.

TABLE 6

Clear Conditioning Shampoo With Added Pearlizing Agent

| Component No. | Component | Amount (weight percent) | Function |
|---|---|---|---|
| 1 | Deionized Water | q.s. to 100 | Diluent |
| 2 | Polymer of Example Nos. 1 and 14 through 19 (30 percent active polymer solids) | 5.00 | Rheology Modifier |
| 3 | Sulfochem ™ ALS-K Surfactant (30 percent active) | 25.00 | Detersive Surfactant |
| 4 | Sulfochem ™ EA-3 Surfactant (27 percent active) | 15.00 | Detersive Surfactant |
| 5 | Chemonic ™ SI-7 Surfactant | 4.00 | Non-Ionic Surfactant |
| 6 | Dow Corning ® 2-8194 Silicone Microemulsion | 2.00 | Conditioning Agent |
| 7 | Fragrance | 0.50 | Fragrance |
| 8 | NaOH (18 percent aqueous weight/weight) | q.s. to pH 6.5 | pH Adjusting Agent |
| 9 | Citric Acid (50 percent aqueous weight/weight) | q.s. to pH 4.5 | pH Adjusting Agent |
| 10 | Phenonip | 0.50 | Preservative |
| 11 | Deionized Water | 10.00 | Diluent |
| 12 | Mica (gold tinted) | 0.20 | Pearlizing Agent |

Components 1 through 4 are added to a vessel in the order listed in the table and mixed under slow agitation until homogeneous. The pH of each formulation is adjusted to approximately 6.5 with NaOH (component 8), and then components 5 to 7 are added to each batch and homogeneously mixed. The pH of each batch is then sequentially reduced with citric acid (component 9) to pH values of 5.5. An alkyl paraben (component 10) is added to each sample at pH 5.5 before additional citric acid is added to achieve a final pH value of 5.0.

Example 44

The polymers of Examples 1 and 14 through 19 are formulated into a pearlized conditioning shampoo composition comprising a cationic polymer conditioning agent and a silicone conditioning agent. The formulation is prepared from the components listed in Table 7.

TABLE 7

Pearlized Conditioning Shampoo

| Component No. | Component | Amount (weight percent) | Function |
|---|---|---|---|
| 1 | Deionized Water | q.s. to 100 | Diluent |
| 2 | Polymer of Example Nos. 1 and 14 through 19 (30 percent active polymer solids) | 5.00 | Rheology Modifier |
| 3 | Sulfochem ™ ALSK Surfactant (30 percent active) | 25.00 | Detersive Surfactant |
| 4 | Sulfochem ™ EA-3 Surfactant (27 percent active) | 15.00 | Detersive Surfactant |
| 5 | Jaguar Excel (2.0 percent solution) | 15.00 | Cationic Conditioning Agent |
| 6 | Chemonic ™ SI-7 Surfactant | 4.00 | Non-Ionic Surfactant |
| 7 | Dow Corning ® 2-8194 Silicone Microemulsion | 2.00 | Conditioning Agent |
| 8 | Fragrance | 0.50 | Fragrance |
| 9 | NaOH (18 percent aqueous weight/weight) | q.s. to pH 6.5 | pH Adjusting Agent |
| 10 | Citric Acid (50 percent aqueous weight/weight) | q.s. to pH 4.0 | pH Adjusting Agent |
| 11 | Glydant ® Plus | 0.50 | Preservative |

TABLE 7-continued

Pearlized Conditioning Shampoo

| Component No. | Component | Amount (weight percent) | Function |
|---|---|---|---|
| 12 | Deionized Water | 10.00 | Diluent |
| 13 | Mica (gold tinted) | 0.20 | Pearlizing Agent |

The components are formulated as set forth in Example 43, except that a cationic conditioning polymer (component 5) is utilized in addition to the silicone conditioning agent (component 7). The pH of the polymer formulations are immediately adjusted with NaOH (component 9) to 6.5, and then downward with citric acid (component 10) to 5.5 where the preservative is added. The pH is then adjusted to a final value of 5.0 with addition citric acid.

Example 45

The polymers of Examples 1 and 14 through 19 are separately formulated into a soap based shower gel composition, which is formulated from the components shown in the Table 8.

TABLE 8

Soap Based Body Wash

| Part | Component No. | Component | Amount (weight percent) | Function |
|---|---|---|---|---|
| Part A | 1 | Deionized Water | 15.0 | Diluent |
|  | 2 | Potassium Hydroxide (91.5 percent aqueous weight/weight) | 6.20 | Neutralizer |
| Part B | 3 | Glycerin | 8.00 | Humectant |
|  | 4 | Lauric Acid | 12.80 | Fatty Acid |
|  | 5 | Myristic Acid (1499) | 3.60 | Fatty Acid |
|  | 6 | Palmitic Acid (1698) | 3.60 | Fatty Acid |
|  | 7 | Polymer of Example Nos. 1 and 14 through 19 (30 percent active polymer solids) | 7.0 | Rheology Modifier |
|  | 8 | Neolone ® 950 | 0.05 | Preservative |
|  | 9 | Deionized Water | q.s. to 100 | Diluent |

Part A is prepared by dissolving potassium hydroxide in deionized water and heating the composition to 80° C. Part B is separately prepared by adding glycerin and the fatty acids (components 4, 5, and 6) to deionized water and mixing until the fatty acids fully melt. Once the fatty acids melt and are homogeneously mixed, the polymer is added to the mixture. Part A is slowly added to Part B under agitation while the temperature is maintained at 80° C. The Part AB composition is mixed for 30 to 60 minutes. Upon attaining a homogeneous mixture, the Part AB composition is allowed to cool at ambient room temperature (20° C. to 21° C.). Upon cooling, component 8 is added and uniformly mixed into the formulation. The formulation is allowed to cool under gentle agitation until ambient room temperature is reached. It is then transferred into 4 ounce jars and 6 dram vials, respectively, and centrifuged to remove any entrained air bubbles. The sample jars and vials containing the centrifuged formulations are capped and held for 24 hours after which viscosity, yield value and clarity property measurements are made. Viscosity and yield value measurements are carried out on the 100 grams sample and clarity is measured on 6 dram vial. The data are presented in Table 8a.

TABLE 8a

| Example No. | pH | Viscosity (mPa·s) | Yield value | Clarity, % T |
|---|---|---|---|---|
| 1 | 9.5 | 3,000 | 90 to 100 | >90 |

While this Example exemplifies the in situ saponification of the fatty acid(s) with a base, a pre-neutralized fatty acid salt can also be employed in the formulation of the cleansing formulation.

Example 46

A pearlized soap/surfactant blend based shower gel composition is formulated from the components are set forth in the Table 9 using polymer Example 1.

TABLE 9

Soap/Surfactant Blend Based Shower Gel

| Part | Component No. | Component | Amount (weight percent) | Function |
|---|---|---|---|---|
| Part A | 1 | Deionized Water | 15.0 | Diluent |
|  | 2 | Potassium Hydroxide (91.5 percent aqueous weight/weight) | 3.90 | Neutralizer |
| Part B | 3 | Glycerin | 8.00 | Humectant |
|  | 4 | Lauric Acid | 7.20 | Fatty Acid |
|  | 5 | Myristic Acid | 2.40 | Fatty Acid |
|  | 6 | Palmitic Acid | 2.40 | Fatty Acid |
|  | 7 | Polymer of Example No. 1 (30 percent active polymer solids) | 7.0 | Rheology Modifier |
|  | 8 | Sulfochem ES-2K (25.0 percent active) | 15.00 | Detersive Surfactant |
|  | 9 | Chembetaine ™ CAD (38 percent active) | 11.85 | Amphoteric Surfactant |
|  | 10 | Neolone ® 950 | 0.05 | Preservative |
| Part B | 11 | Deionized Water | q.s. to 100 | Diluent |
|  | 12 | Citric Acid (25 percent aqueous weight/weight) | 0.5 | pH Adjusting Agent |

Part A is prepared by dissolving potassium hydroxide in deionized water and heating the composition to 80° C. Part B is separately prepared by adding glycerin and polymer no. 1 to deionized water under mixing. The fatty acids (components 5, 6, and 7) are added to Part B, which is heated to 80° C. and mixed until the fatty acids fully melt. Once the fatty acids melt and are homogeneously mixed, Part A is slowly added to Part B under agitation while maintaining the temperature at 80° C. The Part AB composition is mixed for 30 to 60 minutes. Upon attaining a homogeneous mixture, the Part AB composition is allowed to cool at ambient room temperature (20° C. to 21° C.). The surfactant package (components 8 and 9) along with component 10 is added under agitation and mixed until uniform. The formulation is allowed to cool under gentle agitation until ambient room temperature is reached. The pH of the formulation is adjusted from 10.2 (initial) with citric acid (component 12) to an interim pH value of 9.2 before reducing to 8.95. At each pH, sample is transferred into 4 ounce jars and centrifuged to remove any entrained air bubbles. The sample jars containing the centrifuged formulations are capped and held for 24 hours after which viscosity and yield value property measurements are made and presented in Table 9a.

TABLE 9a

| Example No. | pH | Viscosity (mPa·s) | Yield value | Appearance |
|---|---|---|---|---|
| Control 2 | 8.95 | 4,500 | 100 | Clear |
| 1 - Run 1 | 10.2 | 3,000 | 110 | Clear |
| 1 - Run 2 | 9.2 | 4,000 | 120 | Clear |
| 1 - Run 3 | 8.95 | 8,100 | 150 | Clear |

Example 47

A high oil containing moisturizing body wash containing a food preservative is formulated separately from the components and procedure set forth in Table 10 below using polymer Examples 1 and 14 through 19.

TABLE 10

Moisturizing Body Wash

| Part | Component No. | Component | Amount (weight percent) | Function |
|---|---|---|---|---|
| Part A | 1 | Deionized Water | q.s. to 100 | Diluent |
| | 2 | Versene ™ 220 (Tetrasodium EDTA) | 0.05 | Chelating Agent |
| | 3 | Sulfochem ™ ALS Surfactant (30 percent active), | 15.00 | Detersive Surfactant |
| | 4 | Sulfochem ™* EA-3 (27 percent active) | 25.00 | Detersive Surfactant |
| Part B | 5 | Florasun ® 90 Sunflower Oil | 18.00 | Conditioner/ Emollient |
| | 6 | Polymer of Example Nos. 1 and 14 through 19 (30 percent active polymer solids) | 6.60 | Rheology Modifier |
| Part C | 7 | N-Hance ® 3000 | 0.30 | Cationic Conditioner |
| | 8 | Glycerin 99.7 percent - USP | 5.00 | Humectant |
| Part D | 9 | NaOH (18 percent aqueous weight/weight) | 1.50 | pH Adjusting Agent |
| Part E | 10 | Sodium Benzoate | 0.50 | Preservative |
| | 11 | Citric Acid (100 percent) | 0.25 | pH Adjusting Agent |
| | 12 | Chembetaine ™ CGF (35 percent active) | 5.0 | Amphoteric Surfactant |

The body wash is formulated in accordance with the following procedure: (1) combine Part A components and mix until uniform and adjust mixing speed to keep foaming to a minimum; (2) add Part B components in the listed order to Part A with mixing and mix until uniform; (3) in a separate vessel, pre-mix Part C components and add to Part AB and mix until uniform; (4) add Part D (NaOH) to Part ABC and increase mixing speed as needed to maintain a good vortex; and (5) add Part E components one at a time in the order listed to Part ABCD with good mixing in between additions. Increase mixing speed as needed to maintain mixing vortex.

Example 48

A sulfate free bath gel is formulated from the components listed in Table 11 below. The polymer of Examples 1 and 14 through 19 are separately formulated as the rheology modifying component.

TABLE 11

Sulfate Free Bath Gel

| Component No. | Component | Amount (weight percent) | Function |
|---|---|---|---|
| 1 | Deionized Water | q.s. to 100 | Diluent |
| 2 | Polymer of Example Nos. 1 and 14 through 19 (30 percent active polymer solids) | 8.0 | Rheology Modifier |
| 3 | NaOH (18 percent aqueous weight/weight) | q.s. to pH | pH Adjusting Agent |
| 4 | Chemoryl ™ SFB-10SK Surfactant Blend (32 percent active) | 30.0 | Mild Detersive Surfactant Blend (sulfate free) |
| 5 | Cocamidopropyl Betaine (38 percent active) | 8.0 | Amphoteric Detersive Surfactant |
| 6 | Sodium Benzoate | 0.5 | Preservative |
| 7 | Citric Acid (50 percent aqueous weight/weight) | q.s. to pH | pH Adjusting Agent |

The test polymer (component 2) is added to deionized water (component 1) in a glass beaker and mixed gently. The pH of the formulation is adjusted with NaOH (component 3) to 6.5 and then the surfactants (component 4) and (component 5) are added to the contents of the beaker and mixed until homogeneous. The pH of the bath gel contents of the beaker is adjusted to 5.5 with citric acid (component 7). The pH of the bath gel in the beaker is again adjusted with citric acid (component 7) to 5.0. The recipe amount of sodium benzoate is added to the bath gel in the beaker (previously adjusted to pH 5.0), and a final pH adjustment is made with citric acid (component 7) to achieve a pH of 4.0.

Example 49

This Example demonstrates the formulation of a facial scrub composition for the polymers of Examples 1 and 14 through 19. The formulation components are listed in Table 12.

TABLE 12

Facial Scrub:

| Component No. | Component | Amount (weight percent) | Function |
|---|---|---|---|
| 1 | Deionized Water | q.s. to 100 | Diluent |
| 2 | Disodium EDTA | 0.05 | Chelating Agent |
| 3 | Polymer of Example Nos. 1 and 14 through 19 (30 percent active polymer solids) | 6.72 | Rheology Modifier |
| 4 | Sulfochem ™ AOS Surfactant (40 percent active) | 7.575 | Detersive Surfactant |

TABLE 12-continued

Facial Scrub:

| Component No. | Component | Amount (weight percent) | Function |
|---|---|---|---|
| 5 | NaOH (18 percent aqueous weight/weight) | q.s. to pH | pH Adjusting Agent |
| 6 | Chemoryl ™ SFB-10SK Surfactant (32 percent active) | 31.70 | Amphoteric Surfactant |
| 7 | Tween 20 | 1.0 | Solubilizer |
| 8 | Lebermuth Fragrance Oil (No. 90-3000-62) | 0.45 | Fragrance |
| 9 | Glucam ™ E-10 Methyl Glucoside | 0.50 | Non-ionic Surfactant/Humectant |
| 10 | Geogard ® Ultra (sodium benzoate) | 1.00 | Preservative |
| 11 | Chembetaine LEC (35 percent active) | 8.00 | Amphoteric Surfactant |
| 12 | Citric Acid (50 percent aqueous weight/weight) | q.s. to pH | pH Adjusting Agent |
| 13 | Florabeads ™ Jojoba 28/60 Sonora Sand | 0.10 | Exfoliating Agent |
| 14 | Florabeads ™ Jojoba 28/60 Gypsy Rose | 0.10 | Exfoliating Agent |

The facial scrub is formulated in accordance with the following procedure: (1) with gentle mixing add disodium EDTA (component 2) to deionized water (component 1) warmed to 30° C. to 40° C. until the disodium EDTA is fully dissolved; (2) add polymer (component 3) to the mixture until fully dispersed and then add the detersive surfactant (component 4) and continue mixing until homogeneous; (3) under continuous stirring, neutralize the formulation with NaOH (component 5) to raise the pH of the formulation in the range of 6.6 to 6.8; (4) add the amphoteric surfactant (component 6) and mix until homogeneous; (5) in a separate container pre-blend Polysorbate 20 (component 7) and the fragrance oil (component 8) and add the blend to the formulation and mix until homogeneous; (6) add the non-ionic surfactant/humectant, the preservative, and the amphoteric surfactant (components 9, 10, and 11, respectively) in the order listed and mix until homogeneous; and (7) adjust the pH to 5.3 to 5.4 with citric acid (component 12) and add the exfoliating agents (components 13 and 14) and mix until homogeneous.

Example 50

This Example illustrates the formulation of a facial scrub containing the cosmeceuticals agent, salicylic acid. The formulation components are listed in Table 13.

TABLE 13

Facial Scrub

| Component No. | Component | Amount (weight percent) | Function |
|---|---|---|---|
| 1 | Deionized Water | q.s. to 100 | Diluent |
| 2 | Disodium EDTA | 0.050 | Chelating Agent |
| 3 | Polymer of Example No. 2 (30 percent active polymer solids) | 6.72 | Rheology Modifier |
| 4 | Sulfochem ™ AOS Surfactant (40 percent active), | 22.50 | Detersive Surfactant |
| 5 | NaOH (18 percent aqueous weight/weight) | q.s. to pH | pH Adjusting Agent |
| 6 | Chembetaine ™ CAD Surfactant (35 percent active) | 5.70 | Amphoteric Surfactant |
| 7 | Lebermuth Fragrance Oil (No. 50-8001-30) | 0.40 | Fragrance |
| 8 | Deionized Water | 12.53 | Diluent |
| 9 | Zema ™ Propanediol | 2.00 | Diluent |
| 10 | Sulfochem ™ AOS Surfactant (40 percent active) | 7.50 | Detersive Surfactant |
| 11 | Salicylic Acid | 2.00 | Cosmeceutical |
| 12 | Chembetaine ™ CAD Surfactant (35 percent active) | 5.70 | Amphoteric Surfactant |
| 13 | Glucam ™ E-10 Methyl Glucoside | 0.50 | Non-ionic Surfactant/Humectant |
| 14 | Geogard ® Ultra (sodium benzoate) | 1.00 | Preservative |
| 15 | Citric Acid (50 percent aqueous weight/weight) | q.s. to pH | pH Adjusting Agent |
| 16 | Unispheres ™ NLT-2312 Cosmetic Beads | 0.20 | Cosmeceutical/Exfoliant |

The facial scrub is formulated as follows: (1) with gentle mixing add disodium EDTA (component 2) to deionized water (component 1) warmed to 30° C. to 40° C. until the disodium EDTA is fully dissolved; (2) add Polymer No. 2 (component 3) to the mixture until fully dispersed and then add the detersive surfactant (component 4) and continue mixing until homogeneous; (3) under continuous stirring, neutralize the formulation with NaOH (component 5) to raise the pH of the formulation in the range of 6.6 to 6.8; (4) in a separate container pre-blend the amphoteric surfactant (component 6) and the fragrance oil (component 7) and add the pre-blend to the master batch formulation and mix until homogeneous; (5) in a separate vessel pre-blend deionized water (component 8), propane diol (component 9), anionic surfactant (component 10), salicylic acid (component 11), amphoteric surfactant (component 12) and the non-ionic surfactant/humectant component 13) and mix until uniform; (6) add the pre-blend to the master batch formulation and mix until homogeneous; (7) add sodium benzoate (component 14) and adjust the pH to 4.0 to 4.4 with citric acid (component 15); and (8) add the exfoliating agent (component 16) and mix until homogeneous.

Example 51

The following Example demonstrates a liquid dishwashing cleanser formulated using polymers of Examples 1 and 14 through 19 of the invention. The formulation components are set forth in Table 14.

TABLE 14

Liquid Dishwashing Cleanser

| Component No. | Component | Amount (weight percent) | Function |
|---|---|---|---|
| 1 | Deionized Water | q.s. to 100 | Diluent |
| 2 | Polymer of Example Nos. 1 and 14 through 19 (30 weight percent active solids) | 7.0 | Rheology Modifier |
| 3 | Sulfochem ™ SLS Surfactant (30 percent active) | 37.39 | Surfactant |
| 4 | Sulfochem ™ ES-70 Surfactant (70 percent active) | 12.05 | Surfactant |
| 5 | Chemoxide ™ CAW Surfactant (30 percent active) | 3.11 | Surfactant |
| 6 | Geogard ® Ultra (sodium benzoate) | 1.0 | Preservative |
| 7 | NaOH (18 percent aqueous weight/weight) | q.s. to pH | pH Adjusting Agent |
| 8 | Citric Acid (50 percent aqueous weight/weight) | q.s. to pH | pH Adjusting Agent |

The dish washing liquid is formulated as in accordance with the following procedure: (1) into a beaker equipped with a magnetic stir bar, add the polymer (component 2) to deionized water (component 1) and mix under slow agitation (200 rpm); (2) add surfactants (components 3, 4, and 5) in order listed to the beaker and adjust stirring rate to avoid excessive foam generation; (3) add preservative (component 6) and mix until uniform and homogeneous; and (4) adjust the pH of the composition with NaOH (component 7) and/or citric acid (component 8) to pH 5.5.

Example 52

This Example illustrates the preparation of a body lotion utilizing the polymers of Examples 1, 10, and 25. The facial lotion composition is formulated from the components set forth in Table 15.

TABLE 15

Body Lotion

| Part | Component No. | INCI Name | Amount (weight percent) | Function |
|---|---|---|---|---|
| Part A | 1 | Deionized Water | 75.3 | Diluent |
| | 2 | Glycerin | 1.3 | Humectant |
| | 3 | Methyl Gluceth-20 | 1.2 | Humectant |
| | 4 | Diisostearyl Dimer Dilinoleate | 4 | Emollient |
| | 5 | Diisopropyl Sebacate | 2.5 | Emollient |
| | 6 | Isopropyl Isostearate | 1.75 | Emollient |
| | 7 | Cetyl Alcohol | 1.5 | Co-emulsifier |
| | 8 | Cetearyl Alcohol (and) Ceteareth-20 | 3 | Emulsifier |
| Part B | 9 | Polymer of Example Nos. 1, 10, and 25 (30 percent) | 5 | Rheology Modifier |
| | 10 | Sodium Hydroxide | 0.95 | Neutralizer |
| Part C | 11 | Cyclopentasiloxane (and) Dimethiconol | 2.5 | Lubricant/Emollient |
| | 12 | Propylene Glycol, Diazolidinyl Urea, Methylparaben, Propylparaben | 1 | Preservative |

The body lotion is formulated in accordance with the following procedure: (1) add Part A components into a mixing vessel and mix continuously until homogeneous while heating to 65° C. to 70° C.; (2) allow Part A mixture cool to 60° C. and add component 9 while mixing; (3) with continuous mixing, neutralize the formulation with NaOH (component 10) to raise the pH of the formulation to 6.5; (4) allow batch to cool 50° C. and add component 11 while mixing; and (5) add component 12 at 40° C. and mix until homogeneous.

Example 53

This Example illustrates the preparation of a hair color gel utilizing the polymers of Examples 1 and 22. The hair gel composition is formulated from the components set forth in Table 16.

TABLE 16

Hair Color Gel

| Part | Component No. | INCI Name | Amount (Weight Percent) | Function |
|---|---|---|---|---|
| Part A | 1 | Deionized Water | q.s. to 100 | Diluent |
| | 2 | Oleic acid | 0.05 | Surfactant |
| | 3 | Ethanolamine | 0.3 | Neutralizer |
| | 4 | Ethoxy diglycol | 2.5 | Solvent |
| Part B | 5 | Disperse Black 9 | 0.4 | Dye |
| | 6 | HC Red No. 3 | 2.0 | Dye |
| | 7 | Disperse Orange 3 | 1.0 | Dye |
| | 8 | HC Yellow No. 5 | 0.5 | Dye |
| | 9 | HC Yellow No. 4 | 0.8 | Dye |
| Part C | 10 | Lactamide MEA (and) Acetamide MEA | 1.0 | Conditioner |
| | 11 | PEG-2 Cocamine | 2.0 | Conditioner |
| | 12 | Decyl Glucoside | 1.0 | Surfactant |
| | 13 | Disodium EDTA | 0.05 | Chelating Agent |
| | 14 | Erythorbic acid | 0.5 | Anti-oxidant |
| Part D | 15 | Deionized Water | 35.0 | Diluent |
| | 16 | Polymer of Example Nos. 1 and 22 | 1.0 | Thickener |
| | 17 | Propylene Glycol, Diazolidinyl Urea, Methylparaben, Propylparaben, | 1.0 | Preservative |

Procedure: (1) pre-combine ingredients in Part A and heat to 65° C. while mixing to form the soap, continue mixing and cool to 35° C.; (2) pre-combine ingredients in Part B and add to Part A with good mixing—ensure the dyes are completely dissolved before continuing; (3) add Part C ingredients in order to the batch while mixing; (4) add Polymer in the deionized water of Part D in separate vessel along with preservative and mix; and (6) add Part D to the master batch of ABC and mix until homogeneous.

Example 54

This Example illustrates the preparation of a two-part oxidative hair dye utilizing the polymers of Examples 1a and 8a. The two-part hair dye composition is in two separate base systems (activator base and color base). Activator base contains oxidizing agent and rheology modifier. Color base contains anti-oxidizing agent, dyes, dye-couplers, conditioners, optional surfactants, solvents, and neutralizer. Plant derived color bases (U.S. Pat. No. 7,749,286 B2) can also used in place of synthetic dyes. The inventive polymers can also be used in one-part dyeing system, permanent hair color, semi-permanent hair color, liquid color gel, color shampoo, color conditioner, hair color and fixative all in one, and hair color and bleach all in one. The two-part hair dye composition is formulated from the components set forth in Table 17.

TABLE 17

Two-Part Oxidative Hair Dye

| Part | Component No. | INCI Name | Amount (Weight Percent) | Function |
|---|---|---|---|---|
| Activator Phase | | | | |
| | 1 | Deionized Water | 33.0 | Diluent |
| | 2 | Polymer of Example Nos. 1a and 8a (30 percent) | 5.0 | Rheology Modifier |
| | 3 | Hydrogen Peroxide, 50 percent | 12.1 | Oxidizing agent |
| Color Phase | | | | |
| Part A | 4 | Deionized Water | q.s. to 100 | Diluent |
| | 5 | Disodium EDTA | 0.1 | Chelating Agent |
| | 6 | Sodium Metabisulfite | 0.4 | Anti-oxidizing agent |
| | 7 | Propylene Glycol | 4.0 | Solvent |
| | 8 | Butoxy Ethanol | 8.0 | Solvent |
| | 9 | Isopropanol | 8.0 | Solvent |
| Part B | 10 | m-aminophenol | 0.1 | Dye Coupler |
| | 11 | Resorcinol | 0.4 | Dye Coupler |
| | 12 | Toluene-2,5-Diamine Sulfate | 0.3 | Dye |
| | 13 | p-phenylenediamine | 0.5 | Dye |
| | 14 | p-aminophenol | 0.1 | Dye |
| | 15 | Hydroquinone | 0.2 | Dye Coupler |
| Part C | 16 | Oleth-5 | 5.0 | Conditioner |
| | 17 | Oleic acid | 3.0 | Surfactant |
| | 18 | PEG-2 Soyamine | 5.0 | Surfactant |
| | 19 | Cocamide MEA | 5.0 | Surfactant |
| | 20 | Ammonium Laureth Sulfate 28 percent | 2.0 | Surfactant |
| | 21 | $C_{12}$ to $C_{15}$ Pareth-3 | 5.0 | Surfactant |
| Part D | 22 | Ammonium Hydroxide, 28 percent | 6.0 | Neutralizer |

Procedure: Activator base—Add Polymer to deionized water followed by hydrogen peroxide with gently mixing. Color base: (1) Part A—in a separate vessel, dissolve EDTA in about 50° C. deionized water and add components 6 to 9 while mixing; (2) mix Part B and Part C in a separate vessel until homogeneous before adding to Part A; (3) add component 22 to the master batch and adjust to pH 9.0.

Example 55

This Example illustrates the use of polymer as a thickener in a textile print paste (Example 55a) and in a textile coating formulation (Example 55b), at the active polymer weight percent indicated in Table 18.

TABLE 18

Textile Treatment Compositions:

| Component No. | Component | Example 55a | Example 55b |
|---|---|---|---|
| 1 | Deionized Water | q.s. to 100 | q.s. to 100 |
| 2 | Polymer of Example Nos. 2, 15 and 33a | 1.5 (weight percent active solids) | 0.76 (weight percent active solids) |
| 3 | Ammonium hydroxide (28% active) to pH | pH 9.7 | pH 8.5 |
| 4 | Printrite ® 595 Binder | 5.0 | — |
| 5 | Hycar ® 2671 Binder | — | 41.86 |
| 6 | Pigment | 5.0 | — |
| 7 | Foamaster ® DF-160L Defoamer | — | 0.25 |
| 8 | Ammonium Nitrate (25 percent aqueous weight/weight) | — | 0.45 |

While in accordance with the patent statutes the best mode and certain embodiments of the invention have been set forth, the scope of the invention is not limited thereto, but rather by the scope of the attached claims. As such, other variants within the spirit and scope of this invention are possible and will present themselves to those skilled in the art.

What is claimed is:

1. A thickener composition that is the reaction product of the polymerization of a monomer mixture comprising:
   (i) (a), (b), (c), and (d);
   (ii) (a), (b), (c), (d) and (e);
   (iii) (a), (b), (c), (d) and (f);
   (iv) (a), (b), (c), (d) and (g);
   (v) (a), (b), (c), (d), (e) and (f);
   (vi) (a), (b), (c), (d), (e) and (g);
   (vii) (a), (b), (c), (d), (f) and (g); or
   (viii) (a), (b), (c), (d), (e), (f) and (g),
   where (a) is selected from linear, branched and/or cyclic $C_5$ to $C_{18}$ alkenes; (b) is at least one monomer that contains at least one carboxylic acid group; (c) is at least one ethylenically unsaturated ester; (d) is one or more crosslinking compounds; (e) at least one functional monomer selected from one or more functional monomer compounds selected from one or more hydroxy($C_1$-$C_{18}$)alkyl(meth)acrylates, one or more open chain and/or cyclic N-vinylamides, one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds; (f) is at least one associative hydrophobic monomer; and (g) is at least one chain transfer agent and/or at least one polymeric stabilizer.

2. The thickener of claim 1, wherein component (a) is selected from linear, branched and/or cyclic $C_8$ to $C_{12}$ alkenes which can be copolymerized free-radically and which apart from carbon and hydrogen have no further elements.

3. The thickener of claim 1, wherein component (a) is selected from one or more cyclic alkenes selected from limonene, β-pinene, β-terpinene, sabinene, camphene, β-cadinene, β-caryophyllene, cedrene, or mixtures of any two or more thereof.

4. The thickener of claim 3, wherein the one or more cyclic alkenes are free of styrene or analogs of styrene.

5. The thickener of claim 1, wherein component (a) is selected from one or more linear olefin compounds selected from pent-1-ene, hex-1-ene, hept-1-ene, oct-1-ene, non-1-ene, dec-1-ene, undec-1-ene, dodec-1-ene, or mixtures of any two or more thereof.

6. The thickener of claim 1, wherein component (a) is selected from one or more branched olefin compounds selected from, 2-methylbut-1-ene, 2-methylpent-1-ene, 2,4,4-trimethylpent-1-ene, 3-ethyl-2-methylpent-1-ene, 2-methylhex-1-ene, 2,4-dimethylhex-1-ene, 2-methylhept-1-ene, 2-methyloct-1-ene, 2-methylnon-1-ene, 2-methyldec-1-ene, 2,4-dimethyldec-1-ene, 2-methylundec-1-ene, 2,5,8-trimethylnon-1-ene, or mixtures of any two or more thereof.

7. The thickener of claim 1, wherein component (a) comprises about 1 weight percent to about 25 weight percent based on a total monomer mixture weight basis.

8. The thickener of claim 1, wherein component (b) is selected from at least one olefinically unsaturated monocarboxylic and dicarboxylic acid and/or salt thereof containing about 3 to about 5 carbon atoms.

9. The thickener of claim 8, wherein component (b) is selected from acrylic acid, methacrylic acid, fumaric acid, itaconic acid, itaconic anhydride, citraconic acid, citraconic anhydride, ethacrylic acid, alpha-chloroacrylic acid, alpha-cyano acrylic acid, maleic acid, maleic anhydride, or salts thereof, or combinations of any two or more thereof.

10. The thickener of claim 1, wherein component (b) comprises about 10 weight percent to about 55 weight percent based on a total monomer mixture weight basis.

11. The thickener of claim 1, wherein component (c) is selected from at least one (meth)acrylic that contains 1 to 30 carbon atoms and is represented by Formula (I):

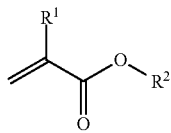

(I)

wherein $R^1$ is hydrogen or a methyl group and $R^2$ is a $C_1$ to $C_{30}$ linear alkyl group or a $C_3$ to $C_{30}$ branched alkyl group.

12. The thickener of claim 11, wherein $R^2$ is a $C_2$ to $C_{24}$ linear alkyl group or a $C_3$ to $C_{24}$ branched alkyl group.

13. The thickener of claim 11, wherein component (c) is selected from methyl (meth)acrylate, ethyl (meth)acrylate, butyl (meth)acrylate, sec-butyl (meth)acrylate, iso-butyl (meth)acrylate, hexyl (meth)acrylate, heptyl (meth)acrylate, octyl (meth)acrylate, 2-ethylhexyl (meth)acrylate, decyl (meth)acrylate, isodecyl (meth)acrylate, lauryl (meth)acrylate, tetradecyl (meth)acrylate, hexadecyl (meth)acrylate, stearyl (meth)acrylate, behenyl (meth)acrylate, or mixtures of any two or more thereof.

14. The thickener of claim 1, wherein component (c) comprises about 20 weight percent to about 75 weight percent based on a total monomer mixture weight basis.

15. The thickener of claim 1, wherein component (d) is selected from at least one polyunsaturated monomer having at least two ethylenically unsaturated carbon-carbon double bonds.

16. The thickener of claim 1, wherein component (d) is selected from ester compounds having two or more ester functionalities per molecule and at least one carbon-carbon double bond per molecule; ether compounds having two or more ether functionalities per molecule and at least one carbon-carbon double bond per molecule; alkenes having two or more, or even three or more, carbon-carbon double bonds, or even two or more, or even three or more, terminal carbon-carbon double bonds; or mixtures of any two or more thereof.

17. The thickener of claim 1, wherein component (d) comprises about 0.01 weight percent to about 5 weight percent based on a total monomer mixture weight basis.

18. The thickener of claim 1, wherein component (e) is selected from at least one functional monomer selected from one or more hydroxy($C_1$-$C_{18}$)alkyl(meth)acrylates, one or more open chain and/or cyclic N-vinylamides, one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds.

19. The thickener of claim 1, wherein component (e) is selected from one or more amino group-containing vinyl monomers selected from (meth)acrylamide, diacetone acrylamide and monomers that are represented by Formulas (II) and (III):

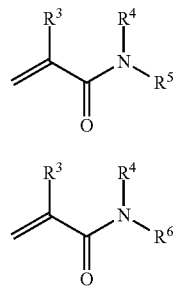

(II)

(III)

wherein Formula (II) represents a N—($C_1$-$C_{12}$)alkyl (meth)acrylamide or a N,N-di($C_1$-$C_5$)alkyl(meth)acrylamide and wherein $R^3$ is a hydrogen or methyl: $R^4$ is selected from a hydrogen, $C_1$ to $C_{12}$ alkyl, or $C_1$ to $C_{12}$ hydroxyalkyl; $R^5$ is selected from $C_1$ to $C_{12}$ alkyl or $C_1$ to $C_{12}$ hydroxyalkyl, and wherein Formula (III) represents a N—($C_1$-$C_{12}$)alkylamino($C_1$-$C_5$)alkyl(meth)acrylamide or a N,N-di-($C_1$-$C_5$)alkylamino ($C_1$-$C_5$)alkyl (meth)acrylamide wherein $R^3$ is a hydrogen or methyl: $R^4$ is selected from a hydrogen, $C_1$ to $C_{12}$ alkyl, or $C_1$ to $C_{12}$ hydroxyalkyl; $R^6$ is selected from $C_1$ to $C_5$ alkylene; $R^7$ is selected from hydrogen or $C_1$ to $C_{12}$ alkyl; and $R^8$ is selected from $C_1$ to $C_{12}$ alkyl.

20. The thickener of claim 19, wherein component (e) is selected from N,N-dimethyl(meth)acrylamide, N,N-diethyl (meth)acrylamide, N,N-(di-2-hydroxyethyl)(meth)acrylamide, N,N-(di-3-hydroxypropyl)(meth)acrylamide, N-methyl,N-ethyl(meth)acrylamide, t-butylacrylamide, t-octylacrylamide, or mixtures of any two or more thereof.

21. The thickener of claim 20, wherein component (e) is selected from N,N-dimethylaminoethyl(meth)acrylamide, N,N-diethylaminoethyl(meth)acrylamide, N,N-dimethylaminopropyl(meth)acrylamide, or mixtures of any two or more thereof.

22. The thickener of claim 18, wherein component (e) is one or more vinyl ester selected from one or more vinyl esters of aliphatic carboxylic acids containing 1 to 22 carbon atoms that are represented by Formula (IV):

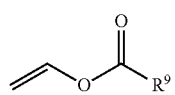

(IV)

wherein $R^9$ is a $C_1$ to $C_{22}$ aliphatic group which can be selected from a linear or branched alkyl.

23. The thickener of claim 22, wherein component (e) is selected from vinyl acetate, vinyl propionate, vinyl butyrate, vinyl isobutyrate, vinyl valerate, vinyl hexanoate, vinyl 2-methylhexanoate, vinyl 2-ethylhexanoate, vinyl iso-octanoate, vinyl nonanoate, vinyl neodecanoate, vinyl decanoate, vinyl undecanoate, vinyl versatate, vinyl laurate, vinyl palmitate, vinyl stearate, or mixtures of any two or more thereof.

24. The thickener of claim 18, wherein component (e) is one or more vinyl aromatic monomers selected from styrene, alpha-methylstyrene, 3-methyl styrene, 4-methyl styrene, 4-propyl styrene, 4-tert-butyl styrene, 4-n-butyl styrene, 4-n-decyl styrene, vinyl naphthalene, or mixtures of any two or more thereof.

25. The thickener of claim 18, wherein component (e) is one or more sulfonic acid group-containing monomers and/or their salts selected from vinyl sulfonic acid, 2-sulfoethyl methacrylate, styrene sulfonic acid, 2-acrylamido-2-methylpropane sulfonic acid (AMPS), allyloxybenzene sulfonic acid, or mixtures of any two or more thereof.

26. The thickener of claim 1, wherein component (e) comprises about 1 weight percent to about 40 weight percent based on a total monomer mixture weight basis.

27. The thickener of claim 1, wherein component (f) is selected from is selected from at least one associative hydrophobic monomer that have an ethylenically unsaturated end group portion (i) for addition polymerization with the other monomers of the system; a polyoxyalkylene midsection portion (ii) for imparting selective hydrophilic properties to the product polymer; and a hydrophobic end group portion (iii) for providing selective hydrophobic properties to the polymer.

28. The thickener of claim 27, wherein component (f) is selected from at least one compound represented by Formula (VI):

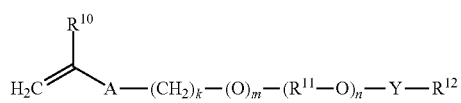

(V)

wherein each $R^{10}$ is independently hydrogen, methyl, —C(O)OH, or —C(O)OR$^{13}$; $R^{13}$ is $C_1$ to $C_{30}$ alkyl; A is —CH$_2$C(O)O—, —C(O)O—, —O—, —CH$_2$O—, —NHC(O)NH—, —C(O)NH—, —Ar—(CE$_2$)$_z$—NHC(O)O—, —Ar—(CE$_2$)$_z$—NHC(O)NH—, or —CH$_2$CH$_2$NHC(O)—; Ar is a divalent aryl; E is a hydrogen or methyl; z is 0 or 1; k is an integer in the range of 0 to about 30, and m is 0 or 1, with the proviso that when k is 0, m is 0, and when k is in the range of 1 to about 30, m is 1; $(R^{11}$—O$)_n$ is a polyoxyalkylene, which is a homopolymer, a random copolymer, or a block copolymer of $C_2$ to $C_4$ oxyalkylene units, wherein $R^{11}$ is $C_2H_4$, $C_3H_6$, or $C_4H_8$, and n is an integer in the range of about 5 to about 250, or from about 5 to about 100, or from about 10 to about 80, or even from about 15 to about 60; Y is —R$^{11}$O—, —R$^{11}$NH—, —C(O)—, —C(O)NH—, —R$^{11}$NHC(O)NH—, or —C(O)NHC(O)—; $R^{12}$ is a substituted or unsubstituted alkyl selected from the group consisting of a $C_8$ to $C_{40}$ linear alkyl, a $C_8$ to $C_{40}$ branched alkyl, a $C_8$ to $C_{40}$ carbocyclic alkyl, a $C_2$ to $C_{40}$ alkyl-substituted phenyl, an aryl-substituted $C_2$ to $C_{40}$ alkyl, and a $C_8$ to $C_{80}$ complex ester; wherein the $R^{12}$ alkyl group optionally comprises one or more substituents selected from a hydroxyl group, an alkoxyl group, and a halogen group.

29. The thickener of claim 28, wherein component (f) is selected one or more of cetyl polyethoxylated methacrylate (CEM), cetearyl polyethoxylated methacrylate (CSEM), stearyl polyethoxylated (meth)acrylate, arachidyl polyethoxylated (meth)acrylate, behenyl polyethoxylated methacrylate (BEM), cerotyl polyethoxylated (meth)acrylate, montanyl polyethoxylated (meth)acrylate, melissyl polyethoxylated (meth)acrylate, lacceryl polyethoxylated (meth)acrylate, tristyrylphenol polyethoxylated methacrylate (TEM), hydrogenated castor oil polyethoxylated methacrylate (HCOEM), canola polyethoxylated (meth)acrylate, and cholesterol polyethoxylated methacrylate (CHEM), where the polyethoxylated portion of the monomer comprises about 5 to about 100 ethylene oxide repeating units.

30. The thickener of claim 29, wherein the polyethoxylated portion of the monomer comprises about 10 to about 80 ethylene oxide repeating units.

31. The thickener of claim 1, wherein component (f) comprises up to about 25 weight percent based on a total monomer mixture weight basis.

32. The thickener of claim 1, wherein component (g) is selected from at least one chain transfer agent.

33. The thickener of claim 32, wherein component (g) is selected from one or more thio and disulfide containing compounds, phosphites and hypophosphites, haloalkyl compounds, metal chelates, unsaturated chain transfer agents, or combinations of any two or more thereof.

34. The thickener of claim 1, wherein component (g) comprises up to about 5 weight percent based on a total monomer mixture weight basis.

35. The thickener of claim 1, wherein the thickener composition has an acid content of at least 10 weight percent and a molecular weight of at least about 50,000 Daltons.

36. The thickener of claim 1, wherein the thickener further comprises at least one polymeric stabilizer.

37. A thickener composition that is the reaction product of the polymerization of a monomer mixture comprising:
(i) (a), (b), (c), and (d);
(ii) (a), (b), (c), (d) and (e);
(iii) (a), (b), (c), (d) and (f);
(iv) (a), (b), (c), (d) and (g);
(v) (a), (b), (c), (d), (e) and (f);
(vi) (a), (b), (c), (d), (e) and (g);
(vii) (a), (b), (c), (d), (f) and (g); or
(viii) (a), (b), (c), (d), (e), (f) and (g),
where (a) is selected from linear, branched and/or cyclic $C_5$ to $C_{18}$ alkenes and is present in the range of about 1 weight percent to about 25 weight percent; (b) is at least one monomer that contains at least one carboxylic acid group and is present in the range of about 10 weight percent to about 55 weight percent; (c) is at least one ethylenically unsaturated ester and is present in the range of about 20 weight percent to about 75 weight percent; (d) is one or more crosslinking compounds and is present in the range of about 0.01 weight percent to about 5 weight percent; (e) at least one functional monomer one or more functional monomer compounds selected from one or more hydroxy($C_1$-$C_{18}$)alkyl(meth)acrylates, one or more open chain and/or cyclic N-vinylamides, one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds and is present in the range of about 1 weight percent to about 40 weight percent; (f) at least one associative hydrophobic monomer and is present in the range of about 0.1 weight percent to about 25 weight percent; (g) at least one chain transfer agent (CTA) and/or at least one polymeric stabilizer and is present in the range of about 0.1 weight percent to about 5 weight percent.

38. A thickener composition that is the reaction product of the polymerization of a monomer mixture comprising:
(i) (a), (b), (c), and (d);
(ii) (a), (b), (c), (d) and (e);
(iii) (a), (b), (c), (d) and (f);
(iv) (a), (b), (c), (d) and (g);
(v) (a), (b), (c), (d), (e) and (f);
(vi) (a), (b), (c), (d), (e) and (g);
(vii) (a), (b), (c), (d), (f) and (g); or
(viii) (a), (b), (c), (d), (e), (f) and (g),
where (a) is selected from linear, branched and/or cyclic $C_5$ to $C_{18}$ alkenes and is present in the range of about 1.5 weight percent to about 22.5 weight percent; (b) is at least one monomer that contains at least one carboxylic acid group and is present in the range of about 12.5 weight percent to about 52.5 weight percent; (c) is at least one ethylenically unsaturated ester and is present in the range of about 22.5 weight percent to about 72.5 weight percent; (d) is one or more crosslinking compounds and is present in the range of about 0.05 weight percent to about 4.5 weight percent; (e) at least one functional monomer one or more functional monomer compounds selected from one or more hydroxy($C_1$-$C_{18}$)alkyl(meth)acrylates, one or more open chain and/or cyclic N-vinylamides, one or more amino group-containing vinyl monomers, one or more vinyl esters of aliphatic carboxylic acids, one or more vinyl aromatic monomers, one or more sulfonic acid group-containing monomers and/or their salts, or mixtures of any two or more thereof including mixtures of any two or more of the same class of compounds or mixtures of any two or more of different classes of compounds and is present in the range of about 1.5 weight percent to about 37.5 weight percent; (f) at least one associative hydrophobic monomer and is present in the range of about 0.2 weight percent to about 22.5 weight percent; (g) at least one chain transfer agent (CTA) and/or at least one polymeric stabilizer and is present in the range of about 0.2 weight percent to about 4.5 weight percent.

* * * * *